(12) United States Patent
Liu et al.

(10) Patent No.: US 12,524,953 B2
(45) Date of Patent: Jan. 13, 2026

(54) SYSTEMS AND METHODS FOR VOLUME DATA RENDERING

(71) Applicant: SHANGHAI UNITED IMAGING HEALTHCARE CO., LTD., Shanghai (CN)

(72) Inventors: Wenqing Liu, Shanghai (CN); Zhiguo Zhang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 137 days.

(21) Appl. No.: 18/589,389

(22) Filed: Feb. 27, 2024

(65) Prior Publication Data
US 2024/0203038 A1   Jun. 20, 2024

Related U.S. Application Data

(63) Continuation of application No. PCT/CN2021/142841, filed on Dec. 30, 2021.

(30) Foreign Application Priority Data

Sep. 1, 2021   (CN) .......................... 202111020745.0

(51) Int. Cl.
 G06T 15/08   (2011.01)
 G06T 15/06   (2011.01)
 G06T 15/20   (2011.01)

(52) U.S. Cl.
 CPC .............. *G06T 15/08* (2013.01); *G06T 15/06* (2013.01); *G06T 15/20* (2013.01); *G06T 2210/41* (2013.01)

(58) Field of Classification Search
 None
 See application file for complete search history.

(56) References Cited

U.S. PATENT DOCUMENTS

| 9,760,690 | B1 | 9/2017 | Petkov et al. |
| 2018/0061111 | A1 | 3/2018 | Engel et al. |
| 2020/0312009 | A1 | 10/2020 | Sun et al. |
| 2020/0380763 | A1 | 12/2020 | Abramov |

(Continued)

FOREIGN PATENT DOCUMENTS

| AU | 2020102667 A4 | 1/2021 |
| CN | 111583099 A | 8/2020 |

(Continued)

OTHER PUBLICATIONS

Thomas Muller et al., Real-time Neural Radiance Caching for Path Tracing, ACM Transactions on Graphics, 40(4): 36:1-36:16, 2021.

(Continued)

*Primary Examiner* — Peter Hoang
(74) *Attorney, Agent, or Firm* — METIS IP LLC

(57) ABSTRACT

The present disclosure relates to systems and methods for volume data rendering. The methods may include obtaining an initial image relating to volume data of a subject by performing a path tracing operation on the volume data, obtaining a total sampling operation count corresponding to the initial image, determining, based on the volume data, one or more reference parameters relating to the initial image, and generating, based on historical image data relating to the volume date of the subject, the initial image, the total sampling operation count, and the one or more reference parameters, a target image using an image processing model.

20 Claims, 9 Drawing Sheets

(56) References Cited

U.S. PATENT DOCUMENTS

2021/0192810 A1 6/2021 Paysan et al.
2022/0392144 A1 12/2022 Cao et al.

FOREIGN PATENT DOCUMENTS

| CN | 111681297 A | 9/2020 |
| CN | 112419153 A | 2/2021 |
| CN | 112669941 A | 4/2021 |
| CN | 112767260 A | 5/2021 |
| EP | 3373245 A2 | 9/2018 |
| EP | 3511908 A1 | 7/2019 |
| EP | 3770847 A1 | 1/2021 |
| JP | 2019208903 A | 12/2019 |
| WO | 2015110012 A1 | 7/2015 |
| WO | 2021057174 A1 | 4/2021 |
| WO | 2021077963 A1 | 4/2021 |
| WO | 2023029321 A1 | 3/2023 |

OTHER PUBLICATIONS

The Extended European Search Report in European Application No. 21955849.1 mailed on Sep. 26, 2024, 9 pages.
International Search Report in PCT/CN2021/142841 mailed on May 30, 2022, 4 pages.
Written Opinion in PCT/CN2021/142841 mailed on May 30, 2022, 4 pages.
First Office Action in Chinese Application No. 202111020745.0 mailed on Jul. 21, 2023, 13 pages.
Han, Baoru et al., Research on Digital Watermarking Algorithm for Medical Volume Data based on Legendre Chaotic Neural Network, CNKI, 2016, 11 pages.

700

- Obtaining one or more opacities of each ray corresponding to each pixel in an image plane by performing, based on a predetermined transfer function, a ray casting operation on medical volume data ~710

- Obtaining an accumulated opacity along each ray corresponding each pixel by accumulating the one or more opacities of the ray ~720

- Determining the depth of the pixel based on a comparison result between the accumulated opacity and a predetermined opacity threshold ~730

- Determining a first camera projection matrix corresponding to a current frame and a second camera projection matrix corresponding to a previous frame based on one or more position parameters of a camera ~810

- Determining coordinates of each pixel in the previous frame based on a depth of the pixel, the first camera projection matrix, and the second camera projection matrix ~820

- Determining a motion vector of the pixel based on the coordinates of the pixel in the previous frame and the coordinates of the pixel in the current frame ~830

FIG. 8

SYSTEMS AND METHODS FOR VOLUME DATA RENDERING

CROSS-REFERENCE TO RELATED APPLICATIONS

This application is a Continuation of International Application No. PCT/CN2021/142841, filed on Dec. 30, 2021, which claims priority of Chinese Patent Application No. 202111020745.0 filed on Sep. 1, 2021, the contents of each of which are incorporated herein by reference.

TECHNICAL FIELD

The present disclosure generally relates to data processing, and in particular, to systems and methods for volume data rendering.

BACKGROUND

Physically based rendering technique on volume data (e.g., medical three-dimensional (3D) imaging data) provides lifelike and visually appealing images through introducing global illumination and shadowing effect. However, this kind of technique is much more computationally intensive than traditional ray-cast volume rendering. The progressive physical rendering technique is used to perform a rendering process on the volume data and provide unconverged rendering results for real-time interaction. In a progressive physical render process, a path tracing operation can be performed on each pixel on an image plane based on the Monte Carlo sampling method. When the camera (or the viewpoint) remains stationary relative to the object, an image corresponding to the current camera position is determined by averaging an intermediate image (e.g., an HDR image) obtained based on the current position and path tracing results of previous frames. However, when the camera moves relative to the subject, the path tracing operation is restarted from the beginning, which involves a large amount of data and requires more complicated calculations.

SUMMARY

An aspect of the present disclosure relates to a method for volume data rendering. The method may be implemented on a computing device having at least one storage device storing a set of instructions, and at least one processor in communication with the at least one storage device. The method may include obtaining an initial image relating to volume data of a subject by performing a path tracing operation on the volume data, obtaining a total sampling operation count corresponding to the initial image, determining, based on the volume data, one or more reference parameters relating to the initial image, and generating, based on historical image data relating to the volume date of the subject, the initial image, the total sampling operation count, and the one or more reference parameters, a target image using an image processing model.

Another aspect of the present disclosure relates to a system for volume data rendering. The system may include at least one storage medium including a set of instructions and at least one processor in communication with the at least one storage medium. When executing the set of instructions, the at least one processor may be directed to cause the system to obtain an initial image relating to volume data of a subject by performing a path tracing operation on the volume data, obtain a total sampling operation count corresponding to the initial image, determine, based on the volume data, one or more reference parameters relating to the initial image, and generate, based on historical image data relating to the volume date of the subject, the initial image, the total sampling operation count, and the one or more reference parameters, a target image using an image processing model.

A further aspect of the present disclosure relates to a non-transitory computer readable medium, including executable instructions that, when executed by at least one processor, direct the at least one processor to perform a method. The method may include obtaining an initial image relating to volume data of a subject by performing a path tracing operation on the volume data, obtaining a total sampling operation count corresponding to the initial image, determining, based on the volume data, one or more reference parameters relating to the initial image, and generating, based on historical image data relating to the volume date of the subject, the initial image, the total sampling operation count, and the one or more reference parameters, a target image using an image processing model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7 is a flowchart illustrating an exemplary process for determining a depth according to some embodiments of the present disclosure;

FIG. 8 is a flowchart illustrating an exemplary process for determining a motion vector according to some embodiments of the present disclosure;

DETAILED DESCRIPTION

Figure 1:
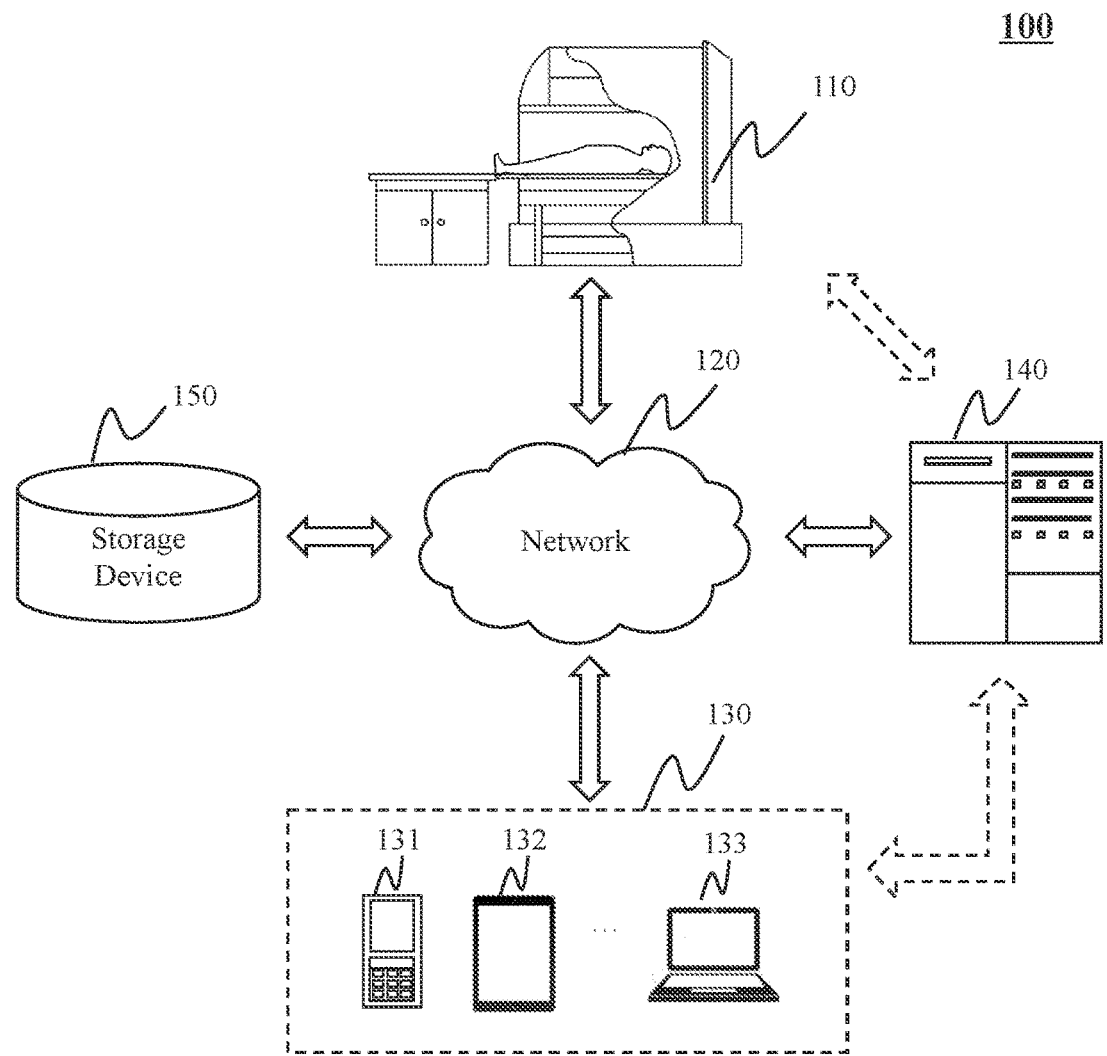
FIG. 1 is a schematic diagram illustrating an exemplary imaging system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

It will be understood that the terms "system," "engine," "unit," "module," and/or "block" used herein are one method to distinguish different components, elements, parts, sections, or assemblies of different levels in ascending order. However, the terms may be displaced by another expression if they achieve the same purpose.

Generally, the words "module," "unit," or "block" used herein refer to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for performing on computing devices (e.g., processor 210 illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to performing). Such software code may be stored, partially or fully, on a storage device of the performing computing device, for performing by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image" in the present disclosure is used to collectively refer to imaging data (e.g., scan data, projection data) and/or images of various forms, including a two-dimensional (2D) image, a three-dimensional (3D) image, a four-dimensional (4D), etc. The term "pixel" and "voxel" in the present disclosure are used interchangeably to refer to an element of an image.

These and other features, and characteristics of the present disclosure, as well as the methods of operation and functions of the related elements of structure and the combination of parts and economics of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

The present disclosure may provide systems and methods for physically based volume rendering. The systems may obtain an initial image relating to volume data of a subject by performing a path tracing operation on the volume data. The systems may further obtain a total sampling operation count corresponding to the initial image and determine, based on the volume data, one or more reference parameters relating to the initial image. Further, the systems may generate, based on historical image data relating to the volume date of the subject, the initial image, the total sampling operation count, and the one or more reference parameters, a target image using an image processing model. According to some embodiments of the systems and methods of the present disclosure, one or more reference parameters may be obtained and input into the image processing model for generating the target image. For example, the one or more reference parameters may include a depth indicating a depth of a corresponding position of a pixel in the volume data and a motion vector determined based on the depth. A corresponding pixel in a historical image (e.g., an image of a previous frame) may be determined based on the motion vector, which may provide spatial domain information as a reference to the image processing model when generating the target image, thereby improving the efficiency and accuracy of volume data rendering. Further, with the historical image data as the input of the image processing model, time domain information of the historical image may be accumulated to the current frame for generating the target image, which may avoid the situation that a path tracing operation and a ray casting operation may be performed on the volume data from the beginning due to a change of the camera position, thereby improving the efficiency and the continuity in time domain of the volume data rendering.

The following description is provided to facilitate better understanding of systems and/or methods for volume data rendering. The description in connection with data relating to the imaging system described below is merely provided as an example, and not intended to limit the scope of the present disclosure. For persons having ordinary skills in the art, the systems and methods disclosed herein may be applied to any other systems and/or devices that generate data to be rendered during operation.

FIG. 1 is a schematic diagram illustrating an exemplary imaging system according to some embodiments of the present disclosure. As illustrated, the imaging system 100 may include an imaging device 110, a network 120, a terminal device 130, a processing device 140, and a storage device 150. The components of the imaging system 100 may be connected in one or more of various ways. For example, the imaging device 110 may be connected to the processing device 140 through the network 120. As another example, the imaging device 110 may be connected to the processing device 140 directly (as indicated by the bi-directional arrow in dotted lines linking the imaging device 110 and the processing device 140). As a further example, the storage device 150 may be connected to the processing device 140 directly or through the network 120. As still a further example, the terminal device 130 may be connected to the processing device 140 directly (as indicated by the bi-directional arrow in dotted lines linking the terminal device 130 and the processing device 140) or through the network 120.

The imaging device 110 may scan a subject located within its detection region and generate or acquire data relating to the subject. For example, the imaging device 110 may scan the subject and generate scan data relating to the brain of the subject. In some embodiments, the data generated or acquired by the imaging device 110 may include volume data (e.g., three-dimensional (3D) volume data, four-dimensional (4D) volume data, etc.). In some embodiments, the subject may include a biological subject and/or a non-biological subject. For example, the subject may include a specific portion of a body, such as the head, the thorax, the abdomen, or the like, or a combination thereof. As another example, the subject may be a man-made composition of organic and/or inorganic matters that are with or without life. In some embodiments, the imaging system 100 may include modules and/or components for performing imaging and/or related analysis. In some embodiments, the data relating to the subject may include projection data, scanning data, one or more images of the subject, etc.

In some embodiments, the imaging device 110 may be a medical imaging device for disease diagnostic or research purposes. The medical imaging device may include a single modality scanner and/or a multi-modality scanner. The single modality scanner may include, for example, an ultrasound scanner, an X-ray scanner, a computed tomography (CT) scanner, a magnetic resonance imaging (MRI) scanner, an ultrasonography scanner, a positron emission tomography (PET) scanner, an optical coherence tomography (OCT) scanner, an ultrasound (US) scanner, an intravascular ultrasound (IVUS) scanner, a near infrared spectroscopy (NIRS) scanner, a far infrared (FIR) scanner, or the like, or any combination thereof. The multi-modality scanner may include, for example, an X-ray imaging-magnetic resonance imaging (X-ray-MRI) scanner, a positron emission tomography-X-ray imaging (PET-X-ray) scanner, a single photon emission computed tomography-magnetic resonance imaging (SPECT-MRI) scanner, a positron emission tomography-computed tomography (PET-CT) scanner, a digital subtraction angiography-magnetic resonance imaging (DSA-MRI) scanner, etc. It should be noted that the scanner described above is merely provided for illustration purposes, and not intended to limit the scope of the present disclosure. The term "imaging modality" or "modality" as used herein broadly refers to an imaging method or technology that gathers, generates, processes, and/or analyzes imaging information of a target subject.

The network 120 may include any suitable network that can facilitate the exchange of information and/or data for the imaging system 100. In some embodiments, one or more components (e.g., the imaging device 110, the terminal device 130, the processing device 140, the storage device 150) of the imaging system 100 may communicate with one or more other components of the imaging system 100 via the network 120. For example, the processing device 140 may obtain volume data from the imaging device 110 via the network 120. In some embodiments, the network 120 may be any type of wired or wireless network, or a combination thereof. The network 120 may be and/or include a public network (e.g., the Internet), a private network, a wired network, a wireless network (e.g., a Wi-Fi network, etc.), a cellular network, and/or any combination thereof.

The terminal device 130 may include a mobile device 131, a tablet computer 132, a laptop computer 133, or the like, or any combination thereof. In some embodiments, the imaging device 110 and/or the processing device 140 may be remotely operated through the terminal device 130. In some embodiments, the imaging device 110 and/or the processing device 140 may be operated through the terminal device 130 via a wireless connection. In some embodiments, the terminal device 130 may receive information and/or instructions inputted by a user, and send the received information and/or instructions to the imaging device 110 or the processing device 140 via the network 120. In some embodiments, the terminal device 130 may receive data and/or information from the processing device 140. In some embodiments, the terminal device 130 may be part of the processing device 140. In some embodiments, the terminal device 130 may be omitted.

The processing device 140 may process data and/or information obtained from the imaging device 110, the terminal device 130, the storage device 150, and/or any other components associated with the imaging system 100. For example, the processing device 140 may process volume data of a subject obtained from the imaging device 110 or the storage device 150. Merely by way of example, the processing device 140 may obtain an initial image relating to the volume data of a subject by performing a path tracing operation on the volume data. The processing device 140 may further generate, based on historical image data related to the volume date of the subject, the initial image, a total sampling operation count, and one or more reference parameters, a target image using an image processing model. Further, the processing device 140 may further control other components in the imaging system 100 based on the data, the information, and/or processing results. In some embodiments, the processing device 140 may be a single server or a server group. The server group may be centralized or distributed. In some embodiments, the processing device 140 may be local or remote. In some embodiments, the processing device 140 may be implemented on a cloud platform. In some embodiments, the processing device 140 may be implemented on a computing device 200 having one or more components illustrated in FIG. 2 in the present disclosure.

The storage device 150 may store data and/or instructions. In some embodiments, the storage device 150 may store data obtained from the imaging device 110, the terminal device 130, and/or the processing device 140. For example, the storage device 150 may store volume data of a subject acquired by the imaging device 110. As another example, the storage device 150 may store a machine learning model used for generating a target image. As a further example, the storage device 150 may store historical image data related to the volume date of the subject. In some embodiments, the storage device 150 may store data and/or instructions that the processing device 140 may execute or use to perform exemplary methods described in the present disclosure. For example, the storage device 150 may store instructions that the processing device 140 may execute to process the volume data acquired by the imaging device 110. In some embodiments, the storage device 150 may include a mass storage device, a removable storage device, a volatile read-and-write memory, a read-only memory (ROM), or the like, or any combination thereof. In some embodiments, the storage device 150 may be implemented on a cloud platform.

In some embodiments, the storage device 150 may be connected to the network 120 to communicate with one or more components (e.g., the imaging device 110, the processing device 140, the terminal device 130) of the imaging system 100. One or more components of the imaging system 100 may access the data or instructions stored in the storage device 150 via the network 120. In some embodiments, the storage device 150 may be directly connected to or communicate with one or more components (e.g., the imaging device 110, the processing device 140, the terminal device 130) of the Imaging system 100. In some embodiments, the storage device 150 may be part of the processing device 140.

In some embodiments, the imaging system 100 may further include one or more power supplies (not shown in FIG. 1) connected to one or more components (e.g., the imaging device 110, the processing device 140, the terminal device 130, the storage device 150) of the imaging system 100.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 2:
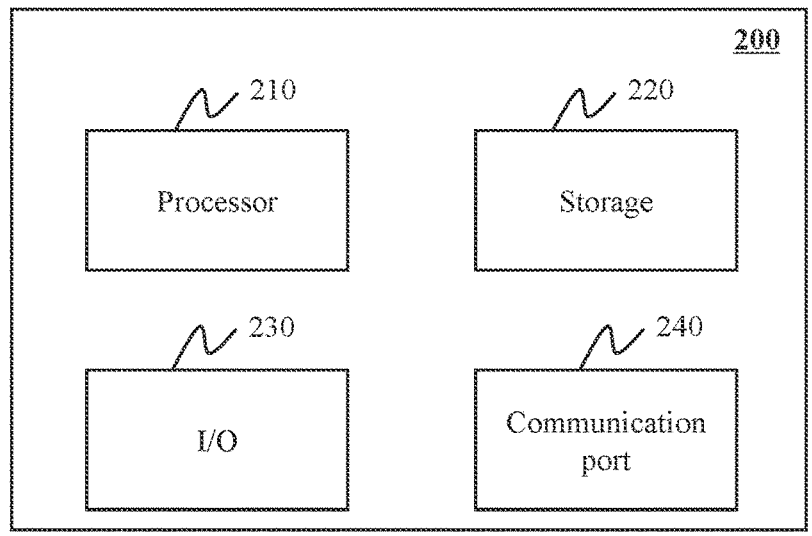
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the processing device 140 may be implemented on the computing device 200. As illustrated in FIG. 2, the computing device 200 may include a data bus 210, a processor 220, a read only memory (ROM) 230, a random access memory (RAM) 240, a communication port 250, an input/output (I/O) 260, a disk 270, and a user interface device 280.

The data bus 210 may be configured to implement data communications among components of the computing device 200. In some embodiments, hardware in the computing device 200 may transmit data via the data bus 210. For example, the processor 220 may send data to a storage or other hardware such as the I/O 260 via the data bus 210.

The processor 220 may execute computer instructions (program code) and perform functions of the processing device 140 in accordance with techniques described herein. The computer instructions may include routines, programs, objects, components, signals, data structures, procedures, modules, and functions, which perform particular functions described herein. For example, the processor 220 may obtain volume data of a subject from the imaging device 110 and generate a target image based on the volume data.

Merely for illustration purposes, only one processor is described in the computing device 200. However, it should be noted that the computing device 200 in the present disclosure may also include multiple processors, and thus operations of a method that are performed by one processor as described in the present disclosure may also be jointly or separately performed by the multiple processors.

The ROM 230 and/or the RAM 240 may store data/ information obtained from the imaging device 110, the terminal device 130, the storage device 150, or any other component of the imaging system 100. In some embodiments, the ROM 230 and/or the RAM 240 may store one or more programs and/or instructions to perform exemplary methods described in the present disclosure. For example, the ROM 230 and/or the RAM 240 may store a program for the processing device 140 for generating a target image based on volume data of a subject.

The communication port 250 may be connected to a network (e.g., the network 120) to facilitate data communications. The communication port 250 may establish connections between the processing device 140 and the imaging device 110, the terminal device 130, the storage device 150, or any other component of the imaging system 100. In some embodiments, the communication port 250 may be a specially designed communication port.

The I/O 260 may input or output signals, data, or information. In some embodiments, the I/O 260 may enable user interaction with the processing device 140. In some embodiments, the I/O 260 may include an input device and an output device. Merely by way of example, a user (e.g., an operator) may input data related to a subject (e.g., a patient) that is being/to be imaged/scanned through the I/O 260. The I/O 260 may also display images generated based on imaging data (e.g., volume data of a subject, an initial image relating to the volume data, a historical target image relating to the volume data, a target image generated based at least on the volume data).

The computing device 200 may also include different forms of program storage units and data storage units. For example, the disk 270 may store various data files used for computer processing and/or communication, and program instructions executed by the processor 220.

The user interface device 280 may implement interaction and information exchange between the computing device 200 and the user.

Figure 3:
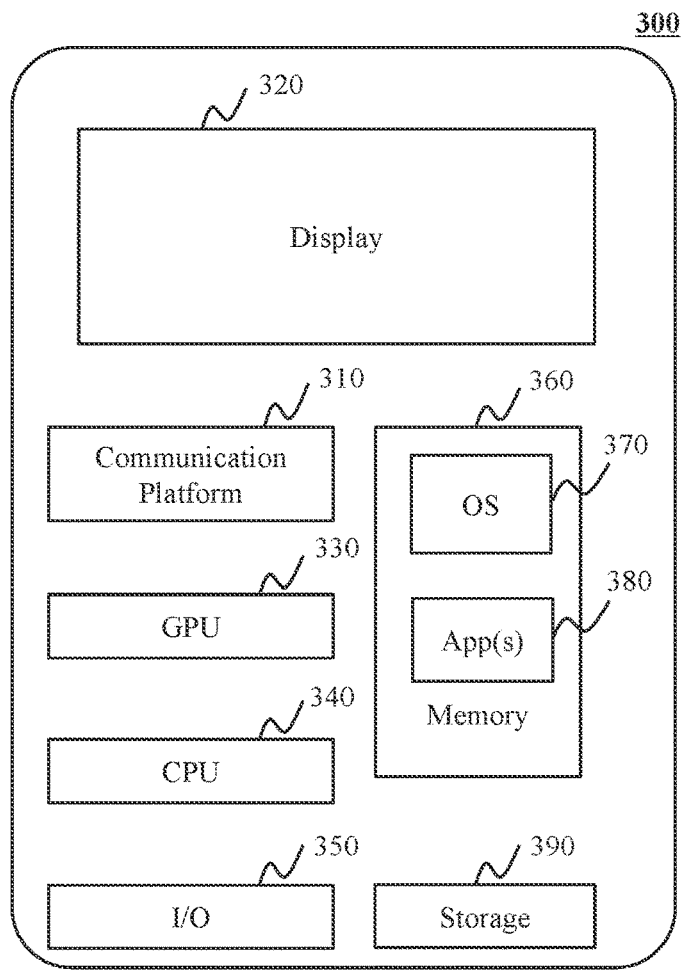
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the terminal device 130 may be implemented on the mobile device 300. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, a mobile operating system 370 (e.g., iOS, Android, Windows Phone) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the volume data rendering as described herein. A computer with user interface elements may be used to implement a personal computer (PC) or another type of work station or terminal device, although a computer may also act as a server if appropriately programmed. The volume data rendering systems and methods may be implemented in the imaging system 100. It is believed that those skilled in the art are familiar with the structure, programming and general operation of such computer equipment and as a result the drawings should be self-explanatory.

Figure 4:
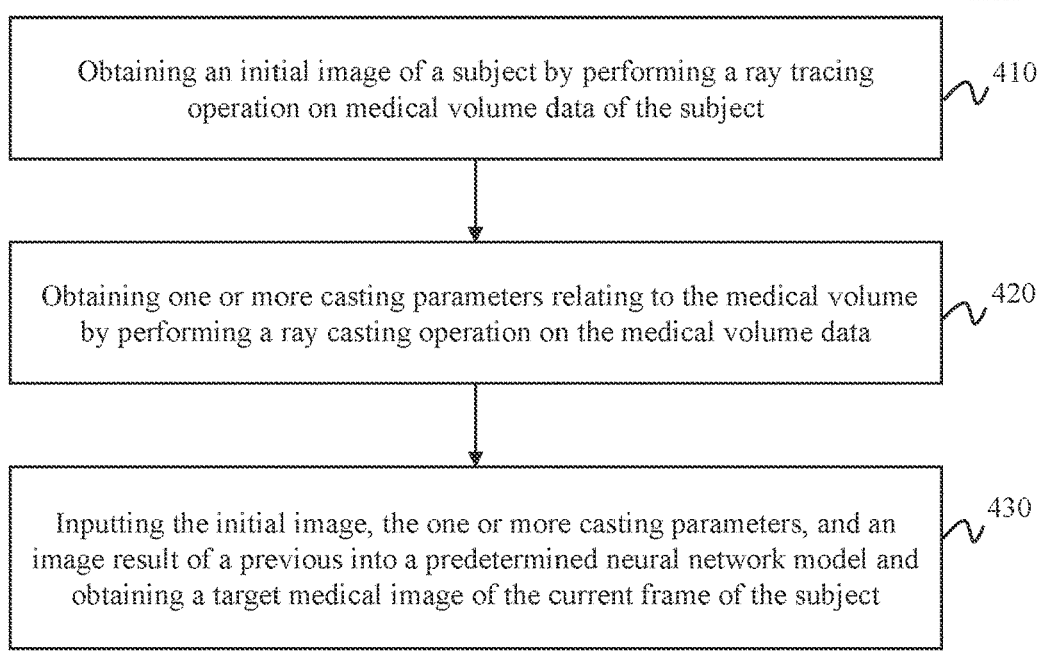
FIG. 4 is a flowchart illustrating an exemplary process for obtaining a target medical image according to some embodiments of the present disclosure.

FIG. 4 is a flowchart illustrating an exemplary process for obtaining a target medical image (also referred to as "target image") according to some embodiments of the present disclosure. In some embodiments, the process 400 may be implemented by an imaging system (e.g., the imaging system 100). In some embodiments, the imaging system may be implemented by software and/or hardware. In some embodiments, at least part of process 400 may be performed by the processing device 140 (implemented in, for example, the computing device 200 shown in FIG. 2). For example, the process 400 may be stored in a storage device (e.g., the storage device 150, the ROM 230, the RAM 240, the storage 390) in the form of instructions (e.g., an application), and invoked and/or executed by the processing device 140 (e.g., the processor 220 illustrated in FIG. 2, the CPU 340 illustrated in FIG. 3, one or more modules illustrated in FIG. 12). The operations of the illustrated process presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting.

In 410, an initial image of a subject may be obtained by performing a path tracing operation on medical volume data (also referred to as "volume data") of the subject. In some embodiments, the processing device 140 (e.g., the obtaining module 1210 illustrated in FIG. 12) may preform operation 410.

In some embodiments, the medical volume data may be acquired based on an interaction between the subject (e.g., a human body) and a medium provided or detected by an imaging device (e.g., the imaging device 110 illustrated in FIG. 1) during a medical scanning process. In some embodiments, the subject may include a patient, a man-made object, etc. In some embodiments, the subject may include a specific portion, organ, and/or tissue of a patient. For example, the subject may include a head, a brain, a neck, a body, a shoulder, an arm, a thorax, a cardiac, a stomach, a blood vessel, a soft tissue, a knee, feet, or the like, or any combination thereof. Exemplary mediums may include an X-ray beam, an electromagnetic field, an ultrasonic wave, a radioactive tracer, or the like, or any combination thereof. Exemplary imaging devices may include an MR scanning device, a CT scanning device, an X-ray scanning device, an ultrasound scanning device, a PET scanning device, a DR scanning device, or the like, or any combination thereof.

In some embodiments, the medical volume data may be obtained from the imaging device directly. In some embodiments, the medical volume data may be retrieved from a storage device (e.g., the storage device 150) disclosed elsewhere in the present disclosure. For example, a database may be configured in the storage device 150 for storing the medical volume data. The medical volume data generated by the imaging device 110 may be transferred to the storage device 150 and stored in the database. The processing device 140 may obtain the medical volume data from the database. In some embodiments, the medical volume data may include 3D volume data, 4D volume data, or the like, or any combination thereof. For example, the medical volume data may include 3D volume data composed of an image sequence including a plurality of image frames. Each image frame may be acquired by the imaging device by performing a scan. In some embodiments, the medical volume data may include a plurality of voxels.

In some embodiments, the initial image may be a first resolution image corresponding to the medical volume data. In some embodiments, the first resolution image may be an original image obtained based on the path tracing operation that is performed with a low sampling rate. In some embodiments, the original image may not be converged or denoised.

In some embodiments, in the path tracing operation performed on the medical volume data of the subject, one or more rays may be transmitted randomly from a current viewpoint and pass through each pixel in an image plane corresponding to the medical volume data. Further, for each of the one or more rays, one or more sampling operations may be performed on the medical volume data by tracing a path of the ray and a radiance corresponding to the ray may be determined. Further, an average radiance corresponding to the pixel may be determined based on one or more radiances corresponding to the one or more rays. Then the initial image may be obtained based on the average radiance corresponding to each pixel. In some embodiments, the initial image may include a high dynamic range (HDR)

image corresponding to a first resolution. More descriptions regarding obtaining the initial image may be found elsewhere in the present disclosure. See, e.g., FIG. 5, and relevant descriptions thereof.

In 420, one or more casting parameters (also referred to as "reference parameter") relating to the medical volume data may be determined by performing a ray casting operation on the medical volume data. In some embodiments, the processing device 140 (e.g., the determination module 1220 illustrated in FIG. 12) may preform operation 420.

In some embodiments, to determine the one or more casting parameters, the processing device 140 may perform, based on each pixel in an image plane corresponding to the medical volume data, the ray casting operation on the medical volume data according to a predetermined transfer function (also referred to as "tracing parameter"). In the ray casting operation, a ray may be transmitted from each pixel in the image plane corresponding to the medical volume data in a certain direction (e.g., a direction along a connection between a current viewpoint and the pixel). The ray may pass through the image sequence in the medical volume data such that the one or more projection parameters may be determined. In some embodiments, the one or more casting parameters may include a depth of each pixel in the initial image, a motion vector of each pixel in the initial image, an optical attribute of each pixel in the initial image, a medical label (also referred to as "label information" or "mask information") of each pixel in the initial image, or the like, or any combination thereof. As used herein, the depth of each pixel in the initial image refers to depth information of the pixel in a rendering result (e.g., the initial image) of the medical volume data. In some embodiments, the depth of each pixel in the initial image indicates a depth of a corresponding position (e.g., a corresponding voxel) of the pixel in the medical volume data. The motion vector of each pixel in the initial image refers to a motion vector of each pixel in the initial image relative to a corresponding pixel in the previous frame. The optical attribute of each pixel in the initial image includes a normal vector corresponding to the depth. The medical label of each pixel in the initial image refers to a label indicating a tissue (or a portion of the human body) to which the pixel (or the corresponding voxel) belongs. In some embodiments, the medical label of each pixel in the initial image may be determined by performing an image segmentation operation on the medical volume data. For example, in the image segmentation operation, the volume data may be labeled with left lung, right lung, an organ, etc. In some embodiments, medical volume data of different tissues may correspond to different labels. More descriptions regarding obtaining the one or more casting parameters may be found elsewhere in the present disclosure. See, e.g., FIGS. 6-8, and relevant descriptions thereof.

In 430, the initial image, the one or more casting parameters, and an image result of a previous frame (also referred to as "historical image data") may be input into a predetermined neural network model (also referred to as "image processing model") and a target medical image (also referred to as "target image") of a current frame of the subject may be generated. In some embodiments, the processing device 140 (e.g., the generation module 1230 illustrated in FIG. 12) may preform operation 430.

In some embodiments, the target medical image may be a second resolution image corresponding to the medical volume data and satisfy a predetermined resolution condition. The second resolution image may be a convergent image and have low noise. In some embodiments, a second resolution of the second resolution image may be higher than or equal to a first resolution of the first resolution image.

In some embodiments, the initial image, the one or more casting parameters, and the image result of a previous frame F(T−1) may be input into the predetermined neural network, and an output of the predetermined neural network may be obtained as a predicted image of the current frame F(t). In such cases, the image result of the previous frame F(T−1) may be used as time domain information for obtaining the predicted image of the current frame F(t) according to a sampling process in a time domain dimension. The predicted image of the current frame F(t) may be a high-resolution medical image that satisfies the predetermined resolution condition, which may be determined as the target medical image.

In some embodiments, the predetermined neural network model may be obtained from one or more components of the imaging system 100 or an external source via a network (e.g., the network 120). For example, the predetermined neural network model may be previously trained by a computing device (e.g., the processing device 140), and stored in a storage device (e.g., the storage device 150, the storage 220, and/or the storage 390) of the imaging system 100. The processing device 140 may access the storage device and retrieve the predetermined neural network model. In some embodiments, the predetermined neural network model may be generated by a computing device (e.g., the processing device 140) by performing a process (e.g., process 900 or process 1400) for generating a predetermined neural network model disclosed herein. More descriptions regarding the generation of the predetermined neural network model may be found elsewhere in the present disclosure. See, e.g., FIG. 9, FIG. 14, and relevant descriptions thereof. Alternatively or additionally, the predetermined neural network model may be generated and provided by a system of a vendor that provides and/or maintains such data processing model, wherein the system of the vendor is different from the imaging system 100. The processing device 140 may acquire the predetermined neural network model from the system of the vendor via a network (e.g., the network 120).

According to the method for obtaining the target medical image illustrated in the process 400, the processing device 140 may obtain the initial image of the subject with a relatively low resolution by performing a path tracing operation on the medical volume data of the subject. Further, the processing device 140 may obtain one or more casting parameters relating to the medical volume data by performing a ray casting operation on the medical volume data. Further, the processing device 140 may obtain the target medical image of the current frame with a relatively high resolution. In such cases, the target medical image may be generated according to the sampling process in the time domain dimension. When the camera moves relative to the subject, the processing device 140 may perform the volume data rendering based on at least a portion of the image result of the previous frame(s). While in a conventional method for the volume data rendering, the sampling operation of the path tracing may be restarted from the beginning when the camera moves relative to the subject, which involves a large amount of data and requires more complicated calculations. Compared with such a conventional method, in the method for obtaining the target medical image illustrated herein, the volume data rendering may be performed based on at least a portion of the image result of the previous frame(s) without performing operations such as the path tracing or the ray casting on the medical volume data from the beginning, which may reduce the amount of data involved in the volume data rendering, thereby improving the efficiency of volume data rendering.

It should be noted that the above description of the process 400 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the process 400 may include an operation for obtaining the predetermined neural network model by performing a training process.

Figure 5:
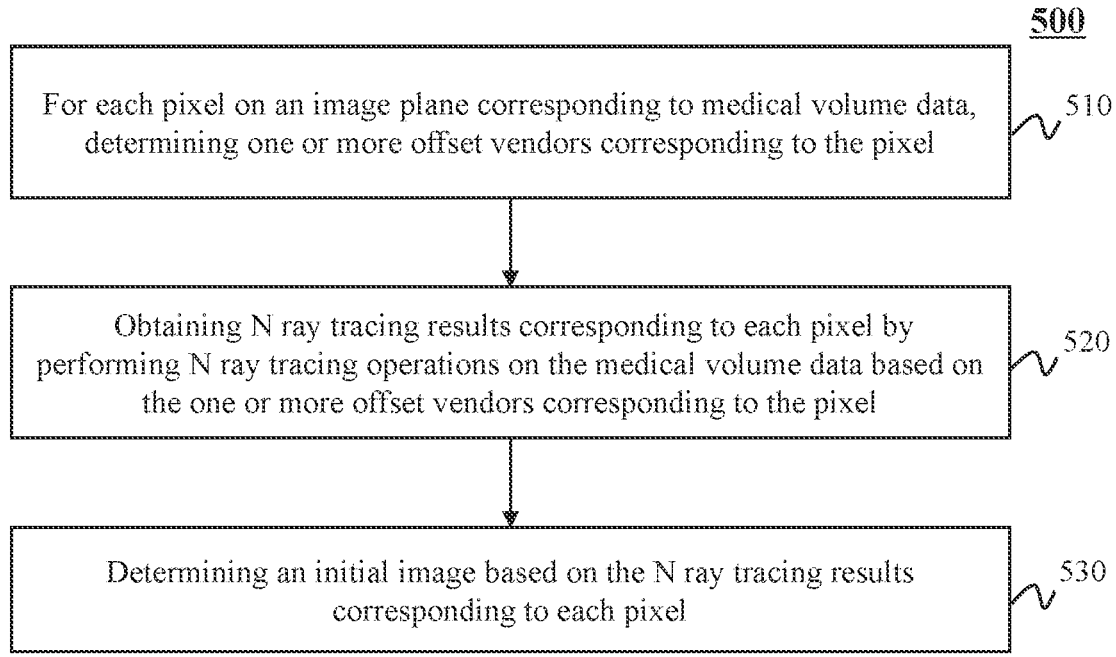
FIG. 5 is a flowchart illustrating an exemplary process for obtaining an initial image according to some embodiments of the present disclosure.

FIG. 5 is a flowchart illustrating an exemplary process for obtaining an initial image according to some embodiments of the present disclosure. In some embodiments, the process 500 may be implemented by an imaging system (e.g., the imaging system 100). In some embodiments, the imaging system may be implemented by software and/or hardware. In some embodiments, at least part of process 500 may be performed by the processing device 140 (implemented in, for example, the computing device 200 shown in FIG. 2). For example, the process 500 may be stored in a storage device (e.g., the storage device 150, the ROM 230, the RAM 240, the storage 390) in the form of instructions (e.g., an application), and invoked and/or executed by the processing device 140 (e.g., the processor 220 illustrated in FIG. 2, the CPU 340 illustrated in FIG. 3, one or more modules (e.g., the obtaining module 1210) illustrated in FIG. 12). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting. In some embodiments, the operation 410 illustrated in FIG. 4 may be performed according to the process 500.

In 510, for each pixel on an image plane corresponding to the medical volume data, one or more offset vendors corresponding to the pixel may be determined.

In some embodiments, to determine the one or more offset vendors corresponding to the pixel, the processing device 140 may determine a position of each pixel in the image plane corresponding to the medical volume data. As used herein, the image plane corresponding to the medical volume data refers to a plane that is identified with a plane of a display monitor used to view an image (e.g., the initial image) that is being rendered. In some embodiments, the term "image plane" and "initial image" in the present disclosure may be used interchangeably to refer to a rendered image. In some embodiments, the image plane may include a plurality of pixels. The processing device 140 may determine a position of each pixel in the image plane. Further, for each pixel, the processing device 140 may determine, based on the position of the pixel, one or more sets of two-dimensional numbers corresponding to the pixel. Then the processing device 140 may determine the one or more offset vendors corresponding to the pixel based on the one or more sets of two-dimensional numbers. Merely by way of example, the pixel may correspond to a region in the image plane. The processing device 140 may determine a center of the region as the position of the pixel. The one or more sets of two-dimensional numbers corresponding to the pixel may be random two-dimensional numbers within a predetermined distance from the center. For each of the one or more sets of two-dimensional numbers, a corresponding offset vendor may be a vector pointing from the center to the two-dimensional number.

In 520, N path tracing results corresponding to each pixel may be obtained by performing N path tracing operations on the medical volume data based on the one or more offset vendors corresponding to the pixel.

In some embodiments, each of the one or more offset vendors may indicate an offset of the position of the pixel. That is, each of the one or more offset vendors may correspond to an offset position of the pixel. To perform a path tracing operation based on the offset vendor, the processing device 140 may determine a connection between the viewpoint (or the camera) and the offset position. Further, the processing device 140 may determine a ray emitted towards the medical volume data in a direction along the connection. Further, the processing device 140 may determine a path tracing result corresponding to the pixel by performing the path tracing operation on the medical volume data based on the ray. In some embodiments, the path tracing result may include a radiance of the ray corresponding to the pixel. For example, the processing device 140 may perform the path tracing operation on the medical volume data based on one or more tracing parameters. The one or more tracing parameters may relate to a display of the medical volume data (or a rendering result of the medical volume data), such as a transfer function, material information, etc. relating to the medical volume data. As used herein, the transfer function refers to a function for converting a data attribute (e.g., a grayscale of a voxel) of the medical volume data into one or more optical attributes (e.g., a color or an opacity of the voxel) of the medical volume data. The processing device 140 may determine the one or more optical attributes of the medical volume data based on the one or more tracing parameters. Further, the processing device 140 may obtain the radiance corresponding to the ray based on the one or more optical attributes.

In some embodiments, for each pixel in the image plane, the processing device 140 may perform N path tracing operations on the medical volume data based on the one or more offset vendors corresponding to the pixel. N may be a path tracing operation count corresponding the current frame. In some embodiments, N may be a natural number larger than 1. In some embodiments, each of the N path tracing operations may correspond to an offset vendor. The processing device 140 may determine N path tracing results by performing N path tracing operations on the medical volume data based on N offset vendors.

In some embodiments, the path tracing operation count N may be determined based on one or more predetermined path tracing operation count thresholds. The one or more predetermined path tracing operation count thresholds may be predetermined by a user. In some embodiments, the one or more predetermined path tracing operation count thresholds may include a first threshold and a second threshold. The first threshold may include a minimum sampling operation count Nmin. A global sampling operation count of each pixel in the initial image may be larger than or equal to Nmin such that the pixel may satisfy the minimum convergence requirement. As used herein, the global sampling operation count of the pixel refers to a sampling operation count of the pixel in the whole volume data rendering process. The second threshold may include a maximum sampling operation count Nmax. The global sampling operation count of each pixel in the initial image may be less than or equal to Nmax such that ghosting in the initial image may be reduced or prevented. In some embodiments, if a total sampling operation count m corresponding to the previous frame (also referred to as "historical total sampling operation count corresponding to the historical image") is less than the minimum sampling operation count Nmin (i.e., m<Nmin), the path tracing operation count N corresponding to the current frame may be determined as a difference between the minimum sampling operation count Nmin and the total sampling operation count m corresponding to the previous frame (i.e., N=Nmin−m). In some embodiments, if the total sampling operation count m corresponding to the previous frame is larger than the minimum sampling operation count Nmin and is less than the maximum sampling operation count Nmax (i.e., Nmin<m<Nmax), the path tracing operation count N corresponding to the current frame may be determined as a fixed value. Alternatively or additionally, the path tracing operation count N corresponding to the current frame may be determined based on the sum of a predetermined step and the total sampling operation count m corresponding to the previous frame. In some embodiments, if the total sampling operation count m corresponding to the previous frame is larger than the maximum sampling operation count Nmax (i.e., m>Nmax), the sampling process in the time domain dimension may be determined to have converged. Accordingly, the path tracing operation count N corresponding to the current frame may be determined as 0. That is, the path tracing operation may be finished.

In 530, the initial image may be determined based on the N path tracing results corresponding to each pixel.

In some embodiments, to determine the initial image, the processing device 140 may determine an average radiance of the radiances in the N path tracing results corresponding to each pixel. Further, the processing device 140 may designate the average radiance as a radiance of the pixel. In such cases, the initial image may be determined based on the radiance of each pixel. In some embodiments, the initial image may correspond to a relatively low resolution.

According to the method for obtaining the initial image illustrated in the process 500, the processing device 140 may obtain the initial image with the relatively low resolution by performing N path tracing operations. A processing process of the initial image with the relatively low resolution may require relatively fewer computing resources, which may improve the efficiency of the processing.

It should be noted that the above description of the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 6:
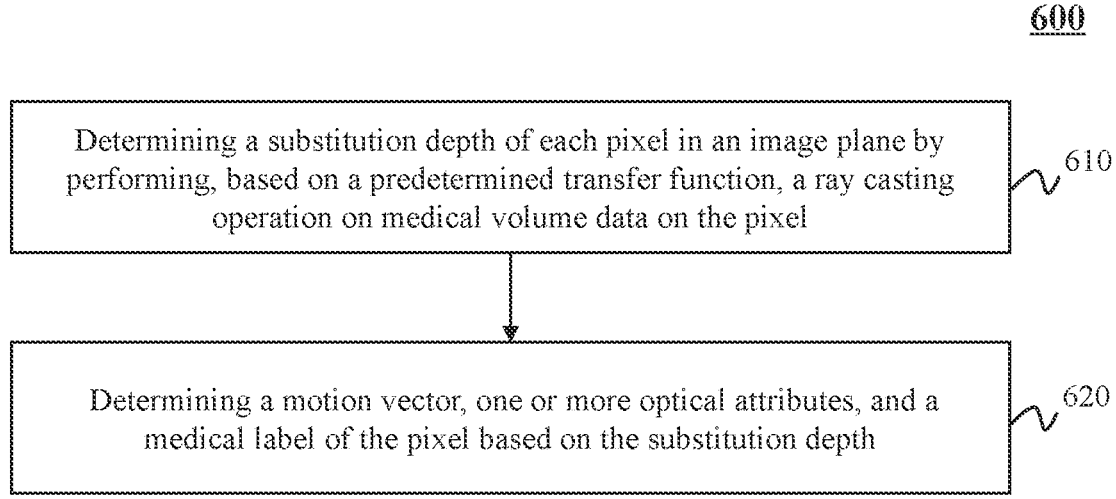
FIG. 6 is a flowchart illustrating an exemplary process for obtaining one or more casting parameters according to some embodiments of the present disclosure.

FIG. 6 is a flowchart illustrating an exemplary process for obtaining one or more casting parameters according to some embodiments of the present disclosure. In some embodiments, the process 600 may be implemented by an imaging system (e.g., the imaging system 100). In some embodiments, the imaging system may be implemented by software and/or hardware. In some embodiments, at least part of process 600 may be performed by the processing device 140 (implemented in, for example, the computing device 200 shown in FIG. 2). For example, the process 500 may be stored in a storage device (e.g., the storage device 150, the ROM 230, the RAM 240, the storage 390) in the form of instructions (e.g., an application), and invoked and/or executed by the processing device 140 (e.g., the processor 220 illustrated in FIG. 2, the CPU 340 illustrated in FIG. 3, one or more modules (e.g., the determination module 1220) illustrated in FIG. 12). The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, the operation 420 illustrated in FIG. 4 may be performed according to the process 600.

In 610, a depth of each pixel in the image plane may be determined by performing, based on a predetermined transfer function (also referred to as "tracing parameter"), a ray casting operation on the medical volume data on the pixel.

As used herein, the depth of the pixel refers to depth information of the pixel in a rendering result (e.g., the initial image) of the medical volume data. In some embodiments, the depth of each pixel in the initial image indicates a depth of a corresponding position (e.g., a corresponding voxel) of the pixel in the medical volume data.

In some embodiments, the predetermined transfer function may include one or more parameters relating to a display of the medical volume data (or a rendering result (e.g., the initial image and/or the target image) of the medical volume data), such as a transfer function, material information, etc. relating to the medical volume data. As used herein, the transfer function refers to a function for converting a data attribute (e.g., a grayscale of a voxel) of the medical volume data into one or more optical attributes (e.g., a color or an opacity of the voxel) of the medical volume data. For example, the transfer function may include a mapping relationship between the grayscale and the one or more optical attributes. In some embodiments, the one or more optical attributes in the mapping relationship may include a color, an opacity, or a normal vector of a voxel in the medical volume data. More descriptions regarding determining the depth may be found elsewhere in the present disclosure. Sec, e.g., FIG. 7, and relevant descriptions thereof.

In 620, a motion vector, an optical attribute, and a medical label of the pixel may be determined based on the depth.

As used herein, the optical attribute of the pixel may include a normal vector corresponding to the depth. In some embodiments, the normal vector of the pixel may be determined by performing a gradient calculation on the medical volume data around the depth. In some embodiments, the gradient calculation may be performed according to a central difference technique. The medical label of the pixel refers to a label indicating a tissue (or a portion of the human body) to which the pixel (or the corresponding voxel) belongs. In some embodiments, the medical label of the pixel may be determined by performing an image segmentation operation on the medical volume data. In some embodiments, different tissues may correspond to different labels.

In some embodiments, the processing device 140 may determine the motion vector of the pixel based on the depth. In some embodiments, the processing device 140 may determine the one or more optical attributes (e.g., the normal vector) of the pixel based on the depth. More descriptions regarding determining the motion vector may be found elsewhere in the present disclosure. See, e.g., FIG. 8, and relevant descriptions thereof.

According to the method illustrated in the process 600, the processing device 140 may obtain the one or more casting parameters of each pixel in the image plane corresponding to the medical volume data by performing a ray casting operation on the medical volume data. The one or more casting parameters may be used as inputs of the predetermined neural network model, which provides data support for the predetermined neural network model in an image processing process.

It should be noted that the above description of the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 7 is a flowchart illustrating an exemplary process for determining a depth according to some embodiments of the present disclosure. In some embodiments, the process 700 may be implemented by an imaging system (e.g., the imaging system 100). In some embodiments, the imaging system may be implemented by software and/or hardware. In some embodiments, at least part of process 700 may be performed by the processing device 140 (implemented in, for example, the computing device 200 shown in FIG. 2). For example, the process 700 may be stored in a storage device (e.g., the storage device 150, the ROM 230, the RAM 240, the storage 390) in the form of instructions (e.g., an application), and invoked and/or executed by the processing device 140 (e.g., the processor 220 illustrated in FIG. 2, the CPU 340 illustrated in FIG. 3, one or more modules (e.g., the determination module 1220) illustrated in FIG. 12). The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting. In some embodiments, the operation 610 illustrated in FIG. 6 may be performed according to the process 700.

In 710, one or more opacities of each ray corresponding to each pixel in the image plane may be obtained by performing, based on a predetermined transfer function, a ray casting operation on the medical volume data.

In some embodiments, for each pixel in the image plane, the ray casting operation may be performed on the medical volume data based on the predetermined transfer function. For example, in the ray casting operation, one or more rays may be transmitted from a current viewpoint, pass through the pixel, and then pass through the medical volume data. For each of the one or more rays, one or more spatial positions (also referred to as "sampling position") in the medical volume data may be determined. Further, an opacity of the ray at each spatial position may be determined based on the predetermined transfer function. For example, the predetermined transfer function may include a mapping relationship between a grayscale and an opacity of a voxel at the spatial position. The opacity of the ray at the spatial position may be determined based on the mapping relationship and the grayscale of the voxel at the spatial position.

In 720, an accumulated opacity (also referred to as "overlay opacity") along each ray corresponding each pixel may be obtained by accumulating the one or more opacities of the ray.

In some embodiments, to obtain the accumulated opacity along each ray corresponding to each pixel, the processing device 140 may accumulate the one or more opacities of the ray. In some embodiments, the accumulated opacity may be determined according to Equation (1) as follows:

$$\alpha'_{dst} = \alpha_{dst} + (1 - \alpha_{dst})\alpha_{src}, \quad (1)$$

where $\alpha_{dst}'$ denotes an accumulated opacity of the ray at a current spatial position, $\alpha_{dst}$ denotes an accumulated opacity of the ray at a previous spatial position, and $\alpha_{src}$ denotes an opacity of voxel of the medical volume data at the current spatial position. In some embodiments, a value of an initial accumulated opacity of the ray may be determined as zero.

In some embodiments, to obtain the accumulated opacity along each ray corresponding each pixel, the processing device 140 may determine an opacity at each spatial position along the ray. Further, the processing device 140 may determine the largest opacity among the opacities at the one or more spatial positions as the accumulated opacity.

In 730, the depth of the pixel may be determined based on a comparison result between the accumulated opacity and a predetermined opacity threshold.

In some embodiments, for the accumulated opacity along each ray corresponding each pixel, the processing device 140 may obtain the comparison result by comparing the accumulated opacity with the predetermined opacity threshold. Further, the processing device 140 may determine the depth of the pixel based on the comparison result. Merely by way of example, the predetermined opacity threshold may be 0.95. If the accumulated opacity at the current spatial position is larger than the predetermined opacity threshold, a depth of the current spatial position may be determined as the depth of the pixel corresponding to the ray. If the accumulated opacity at the current spatial position is less than or equal to the predetermined opacity threshold, the largest opacity among the opacities at the one or more spatial positions may be determined. Further, a depth of the spatial position corresponding to the largest opacity may be determined as the depth of the pixel. In some embodiments, the depth of the pixel may be represented by three-dimensional information of the spatial position. For example, the processing device 140 may obtain a set of coordinates of the spatial position in a three-dimensional coordinate system. Then the depth of the pixel may be represented by the set of coordinates.

It should be noted that the above description of the process 700 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 8 is a flowchart illustrating an exemplary process for determining a motion vector according to some embodiments of the present disclosure. In some embodiments, the process 800 may be implemented by an imaging system (e.g., the imaging system 100). In some embodiments, the imaging system may be implemented by software and/or hardware. In some embodiments, at least part of process 800 may be performed by the processing device 140 (implemented in, for example, the computing device 200 shown in FIG. 2). For example, the process 800 may be stored in a storage device (e.g., the storage device 150, the ROM 230, the RAM 240, the storage 390) in the form of instructions (e.g., an application), and invoked and/or executed by the processing device 140 (e.g., the processor 220 illustrated in FIG. 2, the CPU 340 illustrated in FIG. 3, one or more modules (e.g., the determination module 1220) illustrated in FIG. 12). The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting. In some embodiments, the operation 620 illustrated in FIG. 6 may be performed according to the process 800.

In 810, a first camera projection matrix corresponding to a current frame and a second camera projection matrix corresponding to a previous frame may be determined based on one or more position parameters of the camera.

In some embodiments, in the sampling process in the time domain dimension, the processing device 140 may obtain one or more position parameters of the camera at the current camera position corresponding to the current frame and a previous camera position corresponding to the previous frame, respectively. The one or more position parameters may be used to determine a position of the camera. Merely by way of example, the one or more position parameters may include coordinates indicating the position of the camera. Further, the processing device 140 may determine the first camera projection matrix corresponding to a current frame and a second camera projection matrix corresponding to a previous frame based on the one or more position parameters of the camera. As used herein, the camera projection matrix refers to a matrix that indicates a mapping relationship of the camera from a 3D point (e.g., a voxel) in the medical volume data to a 2D point in the initial image.

In 820, coordinates of each pixel in the previous frame may be determined based on the depth of the pixel, the first camera projection matrix, and the second camera projection matrix.

In some embodiments, to determine the coordinates of each pixel in the previous frame, the processing device 140 may determine coordinates of the pixel in the current frame based on the depth of the pixel. Further, the processing device 140 may determine the coordinates of the pixel in the previous frame based on the depth of the pixel, the first camera projection matrix, the second camera projection matrix, and the coordinates of the pixel in the current frame. In some embodiments, the coordinates of the pixel in the previous frame may be determined according to Equation (2) as follows:

$$p_{n-1} = M_{n-1} M_n^{-1} p_n, \quad (2)$$

where $p_{n-1}$ denotes the coordinates of the pixel in the previous frame n−1, $M_{n-1}$ denotes the second camera projection matrix corresponding to the previous frame n−1, $M_n$ denotes the first camera projection matrix corresponding to the current frame n, and $p_n$ denotes the coordinates of the pixel in the current frame n. In some embodiments, $p_n$ may be expressed as a set of 3D homogeneous coordinates (x, y, z, 1), wherein z denotes the depth of the pixel.

In 830, the motion vector of the pixel may be determined based on the coordinates of the pixel in the previous frame and the coordinates of the pixel in the current frame.

In some embodiments, to determine the motion vector of the pixel, the processing device 140 may determine a difference vector between the coordinates of the pixel in the current frame and the coordinates of the pixel in the previous frame (e.g., by subtracting the coordinates of the pixel in the previous frame from the coordinates of the pixel in the current frame). Further, the processing device 140 may determine the difference vector as the motion vector of the pixel.

It should be noted that the above description of the process 800 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 9:
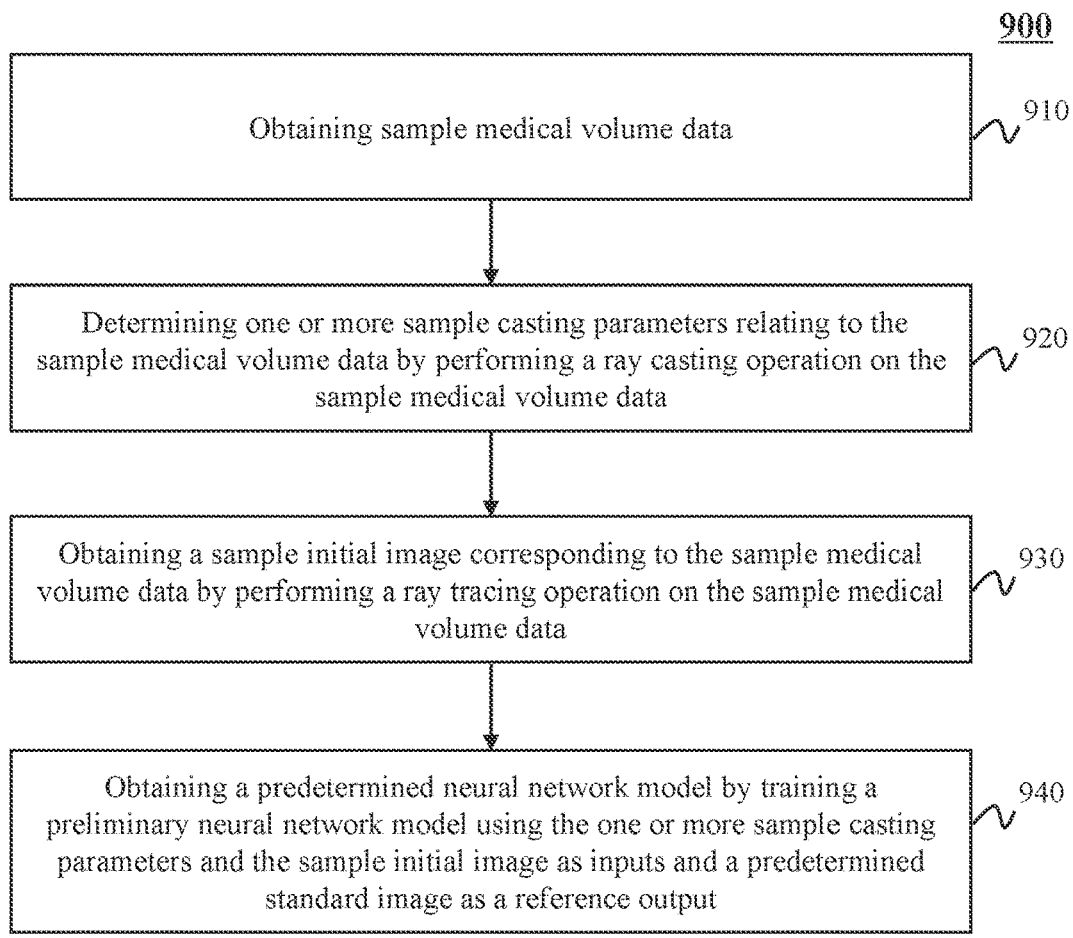
FIG. 9 is a flowchart illustrating an exemplary process for determining a predetermined neural network model according to some embodiments of the present disclosure.

FIG. 9 is a flowchart illustrating an exemplary process for determining a predetermined neural network model according to some embodiments of the present disclosure. In some embodiments, the process 900 may be implemented by an imaging system (e.g., the imaging system 100). In some embodiments, the imaging system may be implemented by software and/or hardware. In some embodiments, at least part of process 900 may be performed by the processing device 140 (implemented in, for example, the computing device 200 shown in FIG. 2). For example, the process 900 may be stored in a storage device (e.g., the storage device 150, the ROM 230, the RAM 240, the storage 390) in the form of instructions (e.g., an application), and invoked and/or executed by the processing device 140 (e.g., the processor 220 illustrated in FIG. 2, the CPU 340 illustrated in FIG. 3, one or more modules illustrated in FIG. 12). The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 910, sample medical volume data may be obtained. In some embodiments, the processing device 140 (e.g., the obtaining module 1210 illustrated in FIG. 12) may perform operation 910.

In some embodiments, the sample medical volume data may be acquired based on an interaction between a subject (e.g., a human body) and a medium provided or detected by an imaging device (e.g., the imaging device 110 illustrated in FIG. 1) during a medical scanning process. Exemplary mediums may include an X-ray beam, an electromagnetic field, an ultrasonic wave, a radioactive tracer, or the like, or any combination thereof. Exemplary imaging devices may include an MR scanning device, a CT scanning device, an X-ray scanning device, an ultrasound scanning device, a PET scanning device, a DR scanning device, or the like, or any combination thereof.

In some embodiments, the sample medical volume data may be obtained from the imaging device directly. In some embodiments, the sample medical volume data may be retrieved from a storage device (e.g., the storage device 150) disclosed elsewhere in the present disclosure. In some embodiments, a plurality sets of sample medical volume data may be obtained. The plurality sets of sample medical volume data may correspond to different resolutions.

In 920, one or more sample casting parameters (also referred to as "sample reference parameter") relating to the sample medical volume data may be determined by performing a ray casting operation on the sample medical volume data. In some embodiments, the processing device 140 (e.g., the determination module 1220 illustrated in FIG. 12) may perform operation 920.

In some embodiments, the one or more sample casting parameters may include a depth, a motion vector, an optical attribute (a normal vector corresponding to the depth), and a medical label relating to the sample medical volume data. In some embodiments, a plurality of camera positions may be determined. The plurality of camera positions may be continuous positions. For each of the plurality of camera positions, one or more sample casting parameters may be determined by performing a ray casting operation on the sample medical volume data according to the camera position. In some embodiments, the one or more sample casting parameters may be obtained in a similar manner as the obtaining of the one or more casting parameters as described in connection with FIGS. 4, and 6-8. For example, the depth relating to the sample medical volume data may be determined by performing, based on a predetermined transfer function, a ray casting operation on the sample medical volume data. Further, the motion vector may be determined based on the depth. The normal vector may be determined by performing a gradient calculation on the sample medical volume data around the depth. The medical label may be determined by performing an image segmentation operation on the sample medical volume data.

In 930, a sample initial image corresponding to the sample medical volume data may be obtained by performing a path tracing operation on the sample medical volume data. In some embodiments, the processing device 140 (e.g., the obtaining module 1210 illustrated in FIG. 12) may perform operation 930.

In some embodiments, for each of the plurality of camera positions, a sample initial image of a current frame may be determined by performing a path tracing operation on the sample medical volume data according to the camera position. In some embodiments, the sample initial image may be obtained in a similar manner as the obtaining of the initial image as described in connection with FIGS. 4 and 5. For example, for each pixel on an image plane corresponding to the sample medical volume data, one or more offset vendors corresponding to the pixel may be determined. Further, the sample initial image may be determined by performing N path tracing operations on the sample medical volume data based on the one or more offset vendors corresponding to each pixel. In some embodiments, the sample initial image may correspond to a relatively low resolution.

In 940, the predetermined neural network model may be obtained by training a preliminary neural network model (also referred to as "preliminary machine learning model") using the one or more sample casting parameters and the sample initial image as inputs and a predetermined standard image (also referred to as "reference image") as a reference output. In some embodiments, the processing device 140 (e.g., the generation module 1230 illustrated in FIG. 12) may perform operation 730.

In some embodiments, the predetermined standard image may include a reference image that satisfies a resolution condition. For example, the resolution condition may be that a resolution of the predetermined standard image is larger than or equal to a predetermined resolution. In some embodiments, the one or more sample casting parameters refer to the one or more sample casting parameters corresponding to the current camera position. The sample initial image refers to the sample initial image of the current frame.

In some embodiments, the predetermined neural network model may be determined according to a training process including one or more iterations. The processing device 140 may determine a loss function for each iteration. Further, the processing device 140 may determine whether the preliminary neural network model converges based on a value of the loss function. In response to determining that the preliminary neural network model converges in a current iteration, the processing device 140 may designate the neural network model in the current iteration as the predetermined neural network model. For example, in at least one current iteration, the one or more sample casting parameters and the sample initial image may be input into the preliminary neural network model and a predicted image corresponding to the sample medical volume data may be obtained. Further, a value of the loss function may be determined based on the predicted image and the predetermined standard image. The value of the loss function may be a pixel loss value that indicates a difference between each pixel in the predicted image and the predetermined standard image. Further, the preliminary neural network model may be trained by adjusting one or more parameters of the preliminary neural network model based on the value of the loss function. Then the predetermined neural network model may be obtained when a convergence condition is satisfied. Exemplary convergence conditions may include that the value of the loss function is less than a predetermined threshold, a certain count of iterations is performed, that the loss function converges such that the differences of the values of the loss function obtained in consecutive iterations are within a threshold, or the like, or any combination thereof.

In some embodiments, the inputs of the preliminary neural network model in the training process sample may further include historical image data relating to the sample volume data. The sample historical image data relating to the sample volume data may include one or more sample casting parameters corresponding to a previous camera position and a sample target image of a previous frame. In some embodiments, the inputs of the preliminary neural network model in the training process sample may further include a total sampling operation count corresponding to the current frame. As used herein, the total sampling operation count corresponding to the current frame refers to a sum of the total sampling operation count corresponding to the previous frame and a path tracing operation count corresponding to the current frame.

It should be noted that the above description of the process 900 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 10:
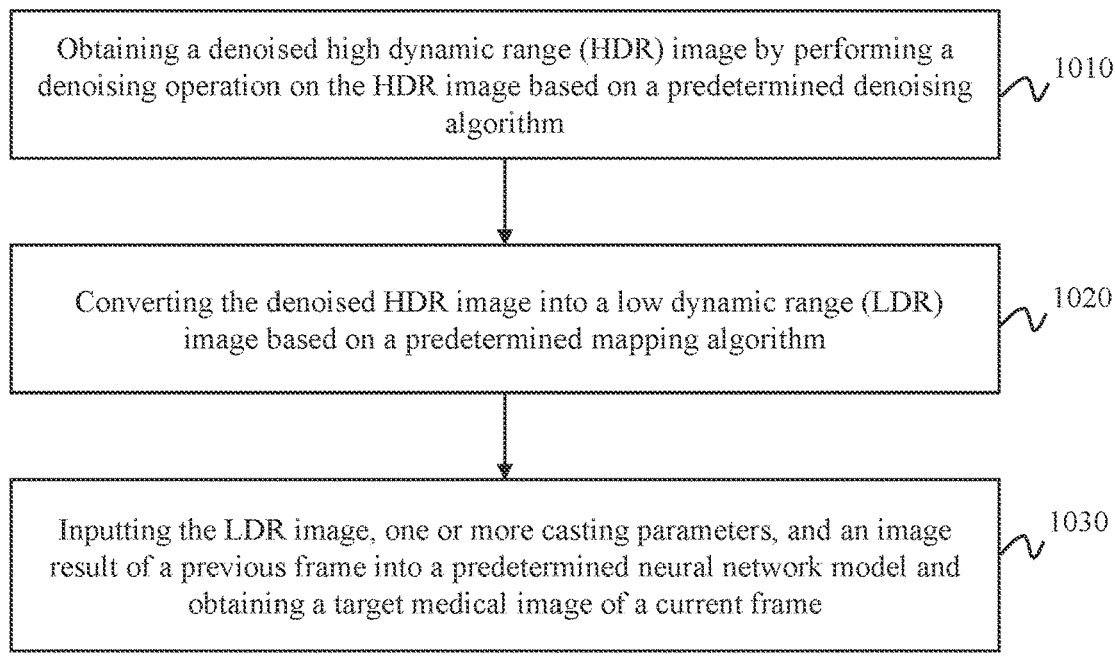
FIG. 10 is a flowchart illustrating another exemplary process for obtaining a target medical image according to some embodiments of the present disclosure.

FIG. 10 is a flowchart illustrating another exemplary process for obtaining a target medical image according to some embodiments of the present disclosure. In some embodiments, the process 1000 may be implemented by an imaging system (e.g., the imaging system 100). In some embodiments, the imaging system may be implemented by software and/or hardware. In some embodiments, at least part of process 1000 may be performed by the processing device 140 (implemented in, for example, the computing device 200 shown in FIG. 2). For example, the process 1000 may be stored in a storage device (e.g., the storage device 150, the ROM 230, the RAM 240, the storage 390) in the form of instructions (e.g., an application), and invoked and/or executed by the processing device 140 (e.g., the processor 220 illustrated in FIG. 2, the CPU 340 illustrated in FIG. 3, one or more modules illustrated in FIG. 12). The operations of the illustrated process presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting.

In 1010, a denoised high dynamic range (HDR) image may be obtained by performing a denoising operation on the HDR image based on a predetermined denoising algorithm. In some embodiments, the processing device 140 (e.g., the obtaining module 1230 illustrated in FIG. 12) may perform operation 1010.

In some embodiments, the initial image obtained based on the path tracing operation may be an HDR image with a relatively low resolution. The denoising operation may be performed on the HDR image such that a denoised HDR image may be obtained. Exemplary denoising algorithms used in the denoising operation may include a non-local means denoising algorithm, a denoising algorithm based on principal component analysis and bilateral filtering, a wavelet transform algorithm, a wavelet threshold denoising algorithm, a contourlet transform algorithm, or the like, or any combination thereof.

In 1020, the denoised HDR image may be converted into a low dynamic range (LDR) image based on a predetermined mapping algorithm. In some embodiments, the processing device 140 (e.g., the determination module 1220 illustrated in FIG. 12) may perform operation 420.

In some embodiments, the processing device 140 may obtain the LDR image based on a predetermined mapping algorithm. An exemplary mapping algorithm may include a tone mapping algorithm. In some embodiments, the LDR image may include an RGB image. In some embodiments, the LDR image may be used to facilitate the image processing of the predetermined neural network model.

In 1030, the LDR image, the one or more casting parameters, and an image result of a previous frame may be input into the predetermined neural network model and a target medical image of a current frame of a subject may be obtained. In some embodiments, the processing device 140 (e.g., the generation module 1230 illustrated in FIG. 12) may perform operation 730.

According to the method for obtaining the target medical image illustrated in the process 1000, the denoising operation may be performed on the HDR image with a relatively low resolution obtained according to the path tracing operation and the denoised HDR image with improved image quality may be obtained. Further, the denoised HDR image may be converted into the LDR image. The LDR image may be input into the predetermined neural network model, which may improve the efficiency of the predetermined neural network model and improve the image quality of the target medical image.

It should be noted that the above description of the process 1000 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operation 1020 may be omitted. The denoised HDR image may be input into the predetermined neural network model directly without conversion. The predetermined neural network model may output an HDR target medical image based on the denoised HDR image. Alternatively or additionally, the HDR target medical image may be further converted into an LDR target medical image. As another example, operation 1010 may be omitted. The predetermined neural network model may include a denoising function. The HDR image with the relatively low resolution may be input into the predetermined neural network model directly without denoising, and noise in the HDR image may be reduced in the predetermined neural network model.

Figure 11:
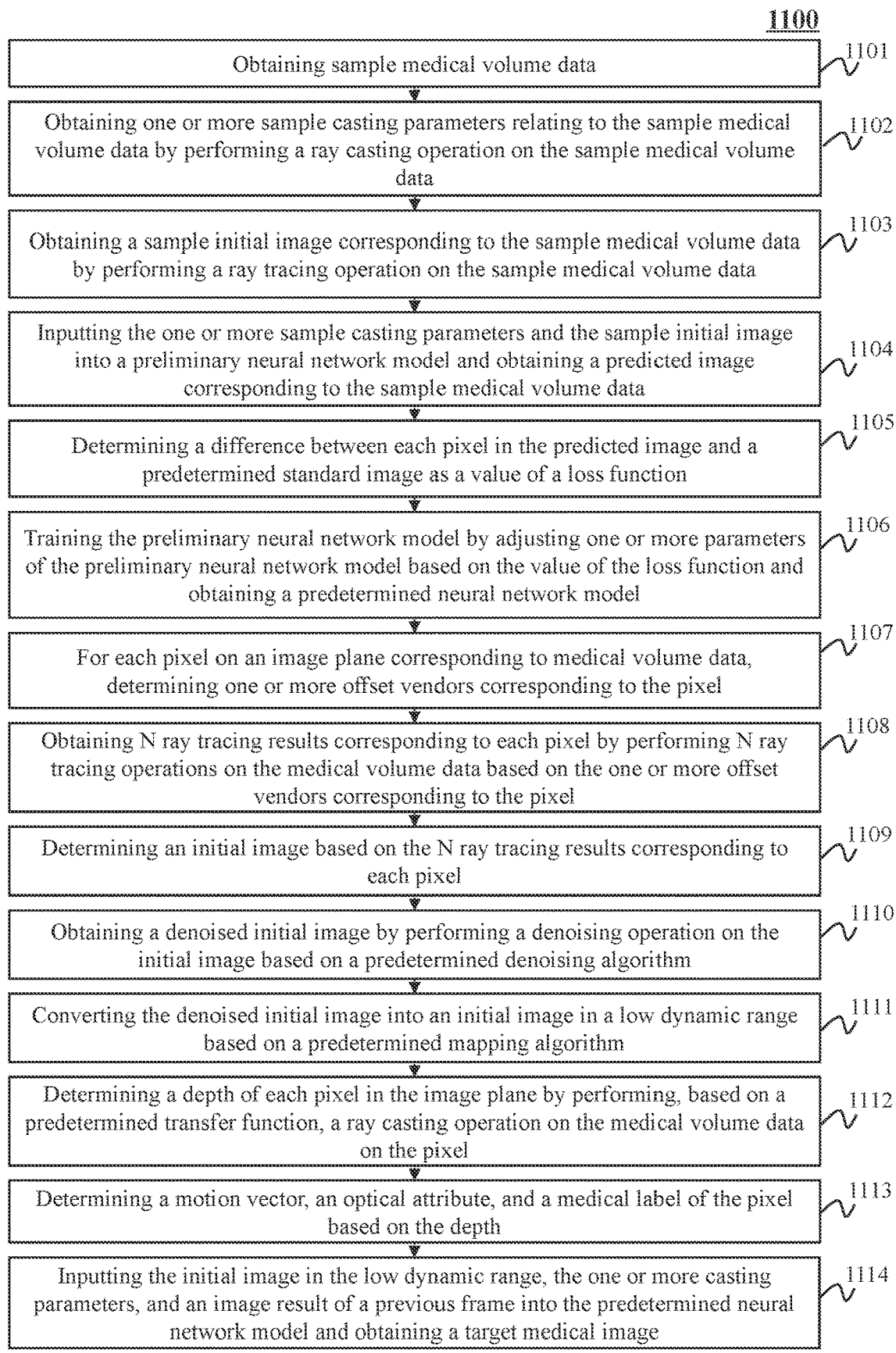
FIG. 11 is a flowchart illustrating another exemplary process for obtaining a target medical image according to some embodiments of the present disclosure.

FIG. 11 is a flowchart illustrating another exemplary process for obtaining a target medical image according to some embodiments of the present disclosure. In some embodiments, the process 1100 may be implemented by an imaging system (e.g., the imaging system 100). In some embodiments, the imaging system may be implemented by software and/or hardware. In some embodiments, at least part of process 1100 may be performed by the processing device 140 (implemented in, for example, the computing device 200 shown in FIG. 2). For example, the process 1100 may be stored in a storage device (e.g., the storage device 150, the ROM 230, the RAM 240, the storage 390) in the form of instructions (e.g., an application), and invoked and/or executed by the processing device 140 (e.g., the processor 220 illustrated in FIG. 2, the CPU 340 illustrated in FIG. 3, one or more modules illustrated in FIG. 12). The operations of the illustrated process presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting.

In 1101, sample medical volume data may be obtained.

In 1102, one or more sample casting parameters relating to the sample medical volume data may be obtained by performing a ray casting operation on the sample medical volume data.

In 1103, a sample initial image corresponding to the sample medical volume data may be obtained by performing a path tracing operation on the sample medical volume data.

In 1104, the one or more sample casting parameters and the sample initial image may be input into the preliminary neural network model and a predicted image corresponding to the sample medical volume data may be obtained. In some embodiments, historical image data relating to the sample volume data and a total sampling operation count corresponding to the current frame may also be input into the preliminary neural network model for obtaining the predicted image.

In 1105, a difference between each pixel in the predicted image and a predetermined standard image may be determined as a value of a loss function.

In 1106, the preliminary neural network model may be trained by adjusting one or more parameters of the preliminary neural network model based on the value of the loss function and a predetermined neural network model may be obtained.

In 1107, for each pixel on an image plane corresponding to medical volume data, one or more offset vendors corresponding to the pixel may be determined.

In 1108, N path tracing results corresponding to each pixel may be obtained by performing N path tracing operations on the medical volume data based on the one or more offset vendors corresponding to the pixel.

In 1109, an initial image may be determined based on the N path tracing results corresponding to each pixel. In some embodiments, the initial image may be an HDR image with a relatively low resolution.

In 1110, a denoised initial image may be obtained by performing a denoising operation on the initial image based on a predetermined denoising algorithm.

In 1111, the denoised initial image may be converted into an initial image in a low dynamic range based on a predetermined mapping algorithm.

In 1112, a depth of each pixel in the image plane may be determined by performing, based on a predetermined transfer function, a ray casting operation on the medical volume data on the pixel.

In 1113, a motion vector, an optical attribute, and a medical label of the pixel may be determined based on the depth.

In 1114, the initial image in the low dynamic range, the one or more casting parameters, and an image result of a previous frame may be input into the predetermined neural network model and a target medical image of a current frame of the subject may be obtained.

According to the method for obtaining the target medical image illustrated in the process 1100, the target medical image of the current frame may be generated based on information of the time domain dimension. For example, when the camera position changes, the processing device 140 may perform the image processing based on the image result of the previous frame, which may avoid the generation of a huge amount of data in a situation that the path tracing operation and the ray casting operation may be performed on the medical volume data from the beginning due to the change of the camera position. In such cases, the amount of data in the image processing process may be reduced, thereby improving the efficiency of the image processing process.

It should be noted that the above description of the process 1100 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operations 1101-1106 may be omitted. The predetermined neural network model may previously be trained by a computing device (e.g., the processing device 140), and stored in a storage device (e.g., the storage device 150, the storage 220, and/or the storage 390) of the imaging system 100. The processing device 140 may access the storage device and retrieve the predetermined neural network model.

Figure 12:
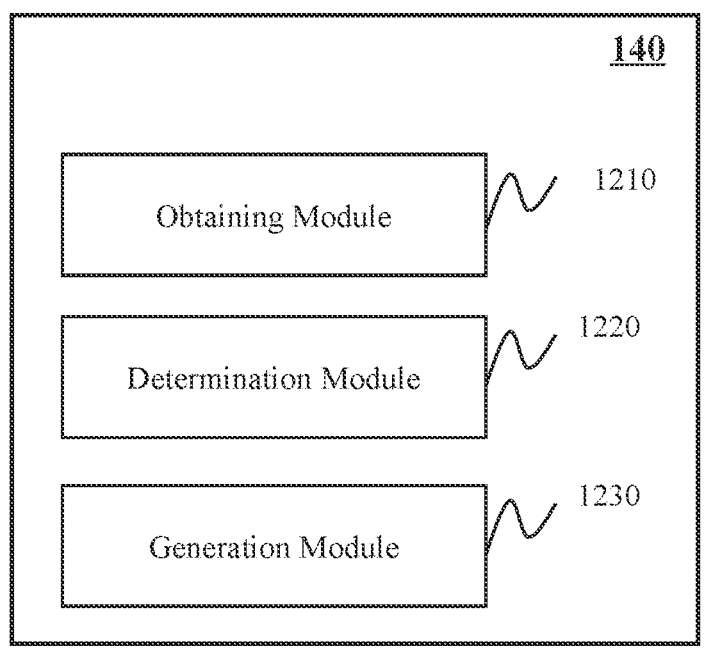
FIG. 12 is a block diagram illustrating an exemplary processing device according to some embodiments of the present disclosure.

FIG. 12 is a block diagram illustrating an exemplary processing device according to some embodiments of the present disclosure. As shown in FIG. 12, the processing device 140 may include an obtaining module 1210, a determination module 1220, and a generation module 1230.

The obtaining module 1210 may be configured to obtain an initial image relating to volume data of a subject by performing a path tracing operation on the volume data. For example, a volume data rendering process may be performed on the volume data based on a plurality of viewpoints. To obtain the initial image of a current frame, the obtaining module 1210 may determine a viewpoint corresponding to the initial image of the current frame. Further, the obtaining module 1210 may obtain one or more tracing parameters (e.g., a transfer function, material information relating to the volume data) relating to the path tracing operation. Further, for each pixel on an image plane corresponding to the initial image, the obtaining module 1210 may determine one or more offset vendors in the image plane. Then the obtaining module 1210 may generate the initial image by performing, based on the viewpoint, the one or more tracing parameters, the one or more offset vendors, and a historical total sampling operation count corresponding to a historical image, the path tracing operation on the volume data. In some embodiments, to generate the initial image by performing, based on the viewpoint, the one or more tracing parameters, the one or more offset vendors, and a historical total sampling operation count corresponding to a historical image, the path tracing operation on the volume data, the obtaining module 1210 may obtain a global sampling operation count range. For example, the global sampling operation count range may be a range from the minimum sampling operation count Nmin to the maximum sampling operation count Nmax illustrated in FIG. 5. Further, the obtaining module 1210 may determine, based on the global sampling operation count range and the historical total sampling operation count, a sampling operation count corresponding to the initial image. Further, the obtaining module 1210 may generate the initial image by performing, based on the viewpoint, the one or more tracing parameters, the one or more offset vendors, and the sampling operation count corresponding to the initial image, the path tracing operation on the volume data.

The obtaining module 1210 may be configured to obtain a total sampling operation count corresponding to the initial image. For example, the obtaining module 1210 may determine the total sampling operation count corresponding to the initial image based on the sampling operation count of the initial image and the historical total sampling operation count.

In some embodiments, the obtaining module 1210 may be configured to obtain a sample initial image relating to sample volume data of a sample subject by performing a first path tracing operation on the sample volume data. For example, the obtaining module 1210 may obtain a plurality of sets of sample volume data of a plurality of sample subjects. The plurality of sets of sample volume data may correspond to different resolutions. For each set of sample volume data, the obtaining module 1210 may obtain a sample initial image by performing the first path tracing operation on the sample volume data. In some embodiments, obtaining module 1210 may be further configured to obtain a sample total sampling operation count corresponding to the initial image.

The determination module 1220 may be configured to determine, based on the volume data, one or more reference parameters relating to the initial image. In some embodiments, the one or more reference parameters relating to the initial image may include a depth of each pixel in the initial image, a normal vector corresponding to the depth, label information of each pixel in the initial image, a motion vector of each pixel in the initial image, or the like, or any combination thereof. In some embodiments, to obtain the one or more reference parameters, for each pixel on the image plane corresponding to the initial image, the determination module 1220 may obtain the depth of each pixel in the initial image by performing, based on the viewpoint and the one or more tracing parameters, a ray casting operation on the volume data. For example, as described in connection with FIG. 7, the determination module 1220 may obtain the depth based on an overlay opacity on each position determined in the ray casting operation and an opacity threshold. In some embodiments, the determination module 1220 may determine the normal vector based on the depth. For example, the determination module 1220 may determine the normal vector by performing a gradient calculation on the volume data around the depth. In some embodiments, the determination module 1220 may obtain the motion vector based on the depth. For example, the determination module 1220 may obtain the motion vector based on the depth according to the Equation (2) as illustrated in FIG. 8. In some embodiments, the determination module 1220 may determine the label information of each pixel in the initial image by performing an image segmentation operation on the volume data.

In some embodiments, the determination module 1220 may be further configured to determine, based on the sample volume data, one or more sample reference parameters relating to the sample initial image. In some embodiments, the determination module 1220 may determine the one or more sample reference parameters in a similar manner as the determination of the one or more reference parameters.

In some embodiments, the determination module 1220 may be further configured to obtain a reference image by performing a second path tracing operation on the sample volume data. In some embodiments, the second path tracing operation may satisfy a path tracing condition. For example, the path tracing condition may include that a second sample sampling operation count used for obtaining the reference image may be larger than a sampling operation count threshold. In some embodiments, the reference image may correspond to a relatively high resolution.

The generation module 1230 may be configured to generate, based on historical image data relating to the volume date of the subject, the initial image, the total sampling operation count, and the one or more reference parameters, a target image using an image processing model. For example, the generation module 1230 may input the historical image data relating to the volume date of the subject, the initial image, the total sampling operation count, and the one or more reference parameters into the image processing model and obtain the target image.

In some embodiments, the generation module 1230 may be further configured to generate the image processing model by training, based on sample historical image data, the sample initial image, the sample total sampling operation count, the one or more sample reference parameters, and the reference image, a preliminary machine learning model. For example, the generation module 1230 may generate the image processing model according to a training process including one or more iterations. In at least one current iteration of the one or more iterations, the generation module 1230 may generate, based on the sample historical image data, the sample initial image, the sample total sampling operation count, and the one or more sample reference parameters, a predicted image using the preliminary machine learning model or an intermediate machine learning model determined in a prior iteration. Further, the generation module 1230 may determine, based on the predicted image and the reference image, a value of a loss function. The generation module 1230 may further determine, based on the value of the loss function, whether a termination condition is satisfied in the current iteration. In response to determining that the termination condition is satisfied in the current iteration, the generation module 1230 may designate the preliminary machine learning model or the intermediate machine learning model as the image processing model.

It should be noted that the above descriptions of the processing device 140 are provided for the purposes of illustration, and not intended to limit the scope of the present disclosure. For persons having ordinary skills in the art, various modifications and changes in the forms and details of the application of the above method and system may occur without departing from the principles of the present disclosure. Merely by way of example, the processing device 140 may include one or more other modules. However, those variations and modifications also fall within the scope of the present disclosure. For example, the initial image obtained by the obtaining module 1210 may be an HDR image. The processing device 140 may include a conversion module configured to convert the HDR image into an LDR image.

Figure 13:
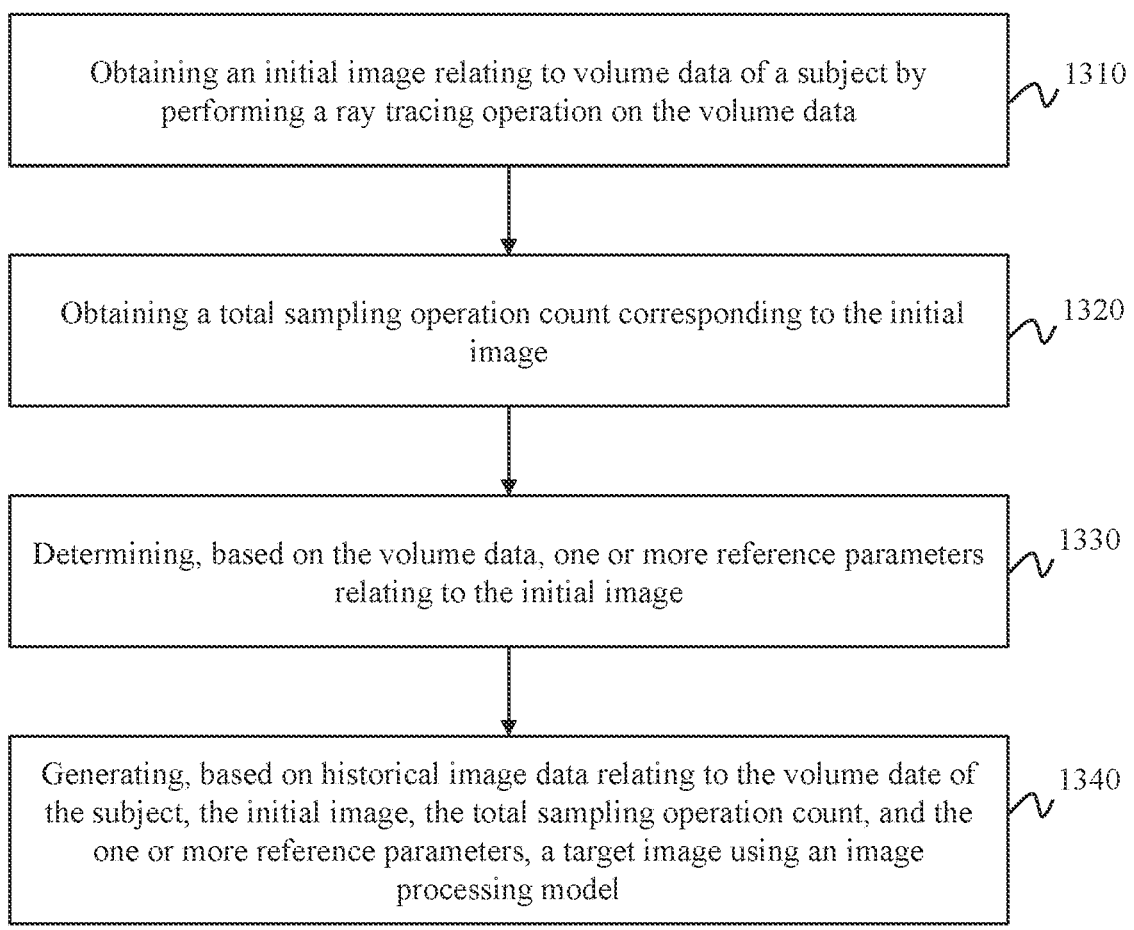
FIG. 13 is a flowchart illustrating an exemplary process for volume data rendering according to some embodiments of the present disclosure.

FIG. 13 is a flowchart illustrating an exemplary process for volume data rendering according to some embodiments of the present disclosure. In some embodiments, the process 1300 may be implemented by an imaging system (e.g., the imaging system 100). In some embodiments, the imaging system may be implemented by software and/or hardware. In some embodiments, at least part of process 1300 may be performed by the processing device 140 (implemented in, for example, the computing device 200 shown in FIG. 2). For example, the process 1300 may be stored in a storage device (e.g., the storage device 150, the ROM 230, the RAM 240, the storage 390) in the form of instructions (e.g., an application), and invoked and/or executed by the processing device 140 (e.g., the processor 220 illustrated in FIG. 2, the CPU 340 illustrated in FIG. 3, one or more modules illustrated in FIG. 12). The operations of the illustrated process presented below are intended to be illustrative. In some embodiments, the process 1300 may be accomplished with one or more additional operations not described, and/or without one or more of the operations discussed. Additionally, the order in which the operations of the process 1300 as illustrated in FIG. 13 and described below is not intended to be limiting.

In 1110, the processing device 140 (e.g., the obtaining module 1210) may obtain an initial image relating to volume data (also referred to as "medical volume data") of a subject by performing a path tracing operation on the volume data.

As described in connection with operation 410, the subject may include a patient, a man-made object, etc. The volume data may be acquired based on an interaction between the subject and a medium provided by an imaging device (e.g., the imaging device 110 illustrated in FIG. 1) during a medical scanning process.

In some embodiments, the volume data may be obtained from the imaging device directly. In some embodiments, the volume data may be obtained from a storage device (e.g., the storage device 150) disclosed elsewhere in the present disclosure. In some embodiments, the volume data may include 3D volume data, 4D volume data, or the like, or any combination thereof. For example, the volume data may include 3D volume data composed of an image sequence including a plurality of image frames. Each image frame may be acquired by the imaging device by performing a scan. In some embodiments, the volume data may include a plurality of voxels.

In some embodiments, the volume data rendering process may be performed on the volume data based on a plurality of viewpoints (also referred to as "camera position"). Correspondingly, an initial image corresponding to each of the plurality of viewpoints may be generated in the volume data rendering process. In some embodiments, as described in connection with FIG. 5, to obtain the initial image of a current frame, the processing device 140 may determine a viewpoint corresponding to the initial image of the current frame. Further, the processing device 140 may obtain one or more tracing parameters (also referred to as "predetermined transfer function") relating to the path tracing operation. The one or more tracing parameters may include parameters relating to a display of the volume data. Exemplary tracing parameters may include a transfer function, material information relating to the volume data, or the like, or any combination thereof. Further, for each pixel on an image plane corresponding to the initial image, the processing device 140 may determine one or more offset vendors in the image plane. Then the processing device 140 may generate the initial image by performing, based on the viewpoint, the one or more tracing parameters, the one or more offset vendors, and a historical total sampling operation count corresponding to a historical image (also referred to as "image (result) of a previous frame"), the path tracing operation on the volume data.

In some embodiments, to generate the initial image by performing, based on the viewpoint, the one or more tracing parameters, the one or more offset vendors, and a historical total sampling operation count corresponding to a historical image, the path tracing operation on the volume data, the processing device 140 may obtain a global sampling operation count range. As used herein, the global sampling operation count range refers to a range of a global sampling operation count of a pixel in the whole volume data rendering process. For example, the global sampling operation count range may be a range from the minimum sampling operation count Nmin to the maximum sampling operation count Nmax illustrated in FIG. 5. Further, the processing device 140 may determine, based on the global sampling operation count range and the historical total sampling operation count, a sampling operation count corresponding to the initial image. For example, the historical total sampling operation count may be a total sampling operation count corresponding to the historical image. As described in connection with FIG. 5, the processing device 140 may determine a sampling operation count corresponding to the initial image based on a comparison result between the historical total sampling operation count and the global sampling operation count range. Further, the processing device 140 may generate the initial image by performing, based on the viewpoint, the one or more tracing parameters, the one or more offset vendors, and the sampling operation count corresponding to the initial image, the path tracing operation on the volume data.

In 1320, the processing device 140 (e.g., the obtaining module 1210) may obtain a total sampling operation count corresponding to the initial image.

In some embodiments, the processing device 140 may determine the total sampling operation count corresponding to the initial image based on the sampling operation count of the initial image and the historical total sampling operation count. For example, the total sampling operation count corresponding to the initial image may be a sum of the sampling operation count of the initial image and the historical total sampling operation count. In some embodiments, the initial image of the current frame may be used as a historical image corresponding to an initial image of the next frame. Correspondingly, the total sampling operation count corresponding to the initial image of the current frame may be used as a historical total sampling operation count corresponding to the initial image of the next frame.

In 1330, the processing device 140 (e.g., the determination module 1220) may determine, based on the volume data, one or more reference parameters (also referred to as "casting parameter") relating to the initial image.

In some embodiments, the one or more reference parameters relating to the initial image may include a depth of each pixel in the initial image, a normal vector corresponding to the depth, label information (also referred to as "medical label") of each pixel in the initial image, a motion vector of each pixel in the initial image, or the like, or any combination thereof. As used herein, the depth of each pixel in the initial image indicates a depth of a corresponding position (e.g., a corresponding voxel) of the pixel in the volume data. The normal vector refers to a normal vector at the corresponding position. The label information of each pixel in the initial image refers to a label indicating a tissue (or a portion of the human body) to which the pixel (or the corresponding voxel) belongs. The motion vector of each pixel in the initial image refers to a motion vector of each pixel in the initial image relative to a corresponding pixel in the historical image.

In some embodiments, to obtain the one or more reference parameters, for each pixel on the image plane corresponding to the initial image, the processing device 140 may obtain the depth of each pixel in the initial image by performing, based on the viewpoint and the one or more tracing parameters, a ray casting operation on the volume data. For example, as described in connection with FIG. 7, the processing device 140 may determine one or more rays transmitted from the viewpoint, passing through the pixel, and then passing through the volume data. For each ray in the ray casting operation, the processing device 140 may obtain an opacity on each position (also referred to as "sampling position") in the volume data along the ray. The processing device 140 may obtain an overlay opacity on each position. For example, the overlay opacity on each position may include a sum of opacities of the current position and all previous positions along the ray. The processing device 140 may further determine the depth based on the overlay opacity and an opacity threshold. For example, the processing device 140 may determine whether the overlay opacity at a current position is larger than the opacity threshold. In response to determining that the overlay opacity is larger than the opacity threshold, the processing device 140 may determine a depth of the current position as the depth of the pixel. In response to determining that the overlay opacity is less than or equal to the opacity threshold, the processing device 140 may determine the largest opacity among the opacities at one or more positions along the ray. Further, the processing device 140 may determine a depth of a position corresponding to the largest opacity as the depth of the pixel. In some embodiments, the processing device 140 may determine the normal vector based on the depth. For example, the processing device 140 may determine the normal vector by performing a gradient calculation on the volume data around the depth. In some embodiments, the processing device 140 may obtain the motion vector based on the depth. For example, the processing device 140 may obtain the motion vector based on the depth according to the Equation (2) as illustrated in FIG. 8. In some embodiments, the processing device 140 may determine the label information of each pixel in the initial image by performing an image segmentation operation on the volume data.

In 1340, the processing device 140 (e.g., the generation module 1230) may generate, based on historical image data relating to the volume date of the subject, the initial image, the total sampling operation count, and the one or more reference parameters, a target image using an image processing model (also referred to as "predetermined neural network model").

In some embodiments, the historical image data relating to the volume data may include a historical target image relating to the volume data, a historical total sampling operation count corresponding to the historical target image, historical reference parameters relating to the historical target image, or the like, or any combination thereof. The historical target image relating to the volume data may be a target image of the previous frame generated using the image processing model. In some embodiments, the historical target image and the initial image may correspond to different viewpoints in the path tracing operation. For example, the historical target image may correspond to a previous viewpoint and the initial image may correspond to a current viewpoint. The previous viewpoint may be different from the current viewpoint. Alternatively or additionally, the historical target image and the initial image may correspond to the same viewpoint. For example, the previous viewpoint and the current viewpoint may overlap.

In some embodiments, the historical image data relating to the volume date of the subject, the initial image, the total sampling operation count, and the one or more reference parameters may be input into the image processing model, and the image processing model may output the target image. In some embodiments, the image processing model may be obtained from one or more components of the imaging system 100 or an external source via a network (e.g., the network 120). For example, the image processing model may be previously trained by a computing device, and stored in a storage device (e.g., the storage device 150, the storage 220, and/or the storage 390) of the imaging system 100. The processing device 140 may access the storage device and retrieve the image processing model. In some embodiments, the image processing model may be generated by a computing device by performing a process (e.g., process 900 or process 1400) for generating an image processing model disclosed herein. More descriptions regarding the generation of the image processing model may be found elsewhere in the present disclosure. Sec, e.g., FIG. 9, FIG. 14, and relevant descriptions thereof. Alternatively or additionally, the image processing model may be generated and provided by a system of a vendor that provides and/or maintains such image processing model, wherein the system of the vendor is different from the imaging system 100. The processing device 140 may acquire the image processing model from the system of the vendor via a network (e.g., the network 120).

In some embodiments, the image processing model may be further configured with a denoising function. For example, the image processing model may include a first sub-model for generating the target image and a second sub-model for performing a denoising operation on the target image. As another example, the image processing model may be obtained by training a preliminary machine learning model using a plurality of reference images with low noise.

It should be noted that the above description of the process 1300 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the process 1300 may include a training operation in which the image processing model above may be generated. As another example, the initial image obtained in operation 1310 may be an HDR image, and the process 1300 may include a conversion operation in which the HDR image may be converted into an LDR image before the target image is generated. As a further example, the target image obtained in operation 1340 may be an HDR image, and the process 1300 may include a conversion operation in which the HDR image may be converted into an LDR image after the target image is generated. As still a further example, although a process for rendering volume data relating to the imaging system is illustrated in process 1300, it should be understood that the method disclosed herein may also be applied to any other systems and/or devices for data rendering.

Figure 14:
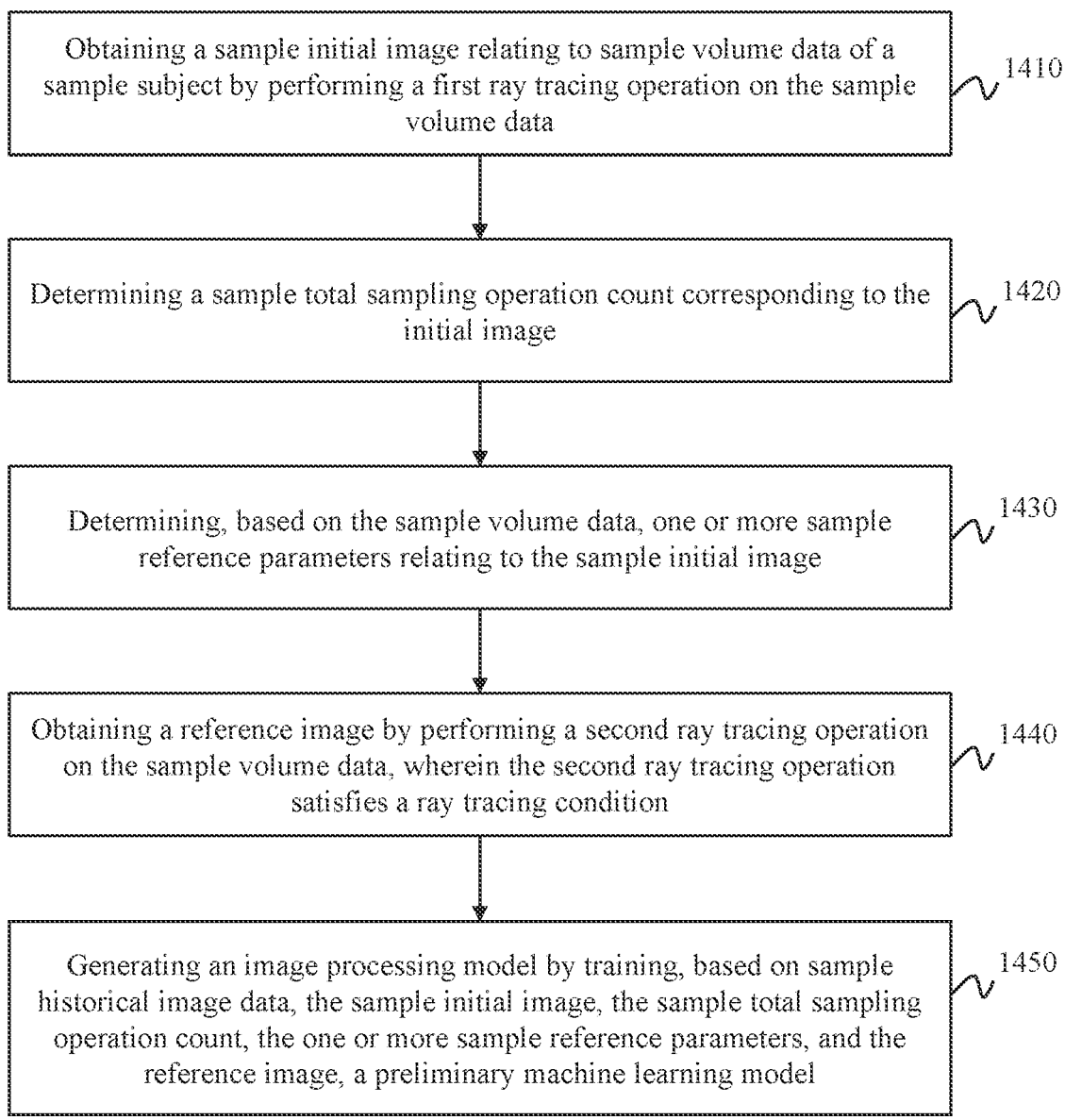
FIG. 14 is a flowchart illustrating an exemplary process for generating an image processing model according to some embodiments of the present disclosure.

FIG. 14 is a flowchart illustrating an exemplary process for generating an image processing model according to some embodiments of the present disclosure. In some embodiments, process 1400 may be executed by an imaging system (e.g., the imaging system 100). In some embodiments, the imaging system may be implemented by software and/or hardware. In some embodiments, at least part of process 1400 may be performed by the processing device 140 (implemented in, for example, the computing device 200 shown in FIG. 2). For example, the process 1400 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, one or more modules illustrated in FIG. 12). The operations of the illustrated process presented below are intended to be illustrative. In some embodiments, the process 1400 may be accomplished with one or more additional operations not described, and/or without one or more of the operations discussed. Additionally, the order in which the operations of the process 1400 as illustrated in FIG. 8 and described below is not intended to be limiting. Alternatively, the process 1400 may be performed by a computing device of a system of a vendor that provides and/or maintains such image processing model, wherein the system of the vendor is different from the imaging system 100.

In 1410, the processing device 140 (e.g., the obtaining module 1210) may obtain a sample initial image relating to sample volume data of a sample subject by performing a first path tracing operation on the sample volume data.

In some embodiments, the processing device 140 may obtain a plurality of sets of sample volume data of a plurality of sample subjects. In some embodiments, the plurality of sets of sample volume data may correspond to different resolutions. For each set of sample volume data, the processing device 140 may obtain a sample initial image by performing a first path tracing operation on the sample volume data. In some embodiments, the sample initial image may be obtained in a similar manner as the obtaining of the initial image as described in connection with FIG. 13. For example, the processing device 140 may generate the sample initial image by performing, based on a sample viewpoint, one or more sample tracing parameters, one or more sample offset vendors, and a sample historical total sampling operation count corresponding to a historical image, the first path tracing operation on the sample volume data.

In 1420, the processing device 140 (e.g., the obtaining module 1210) may obtain a sample total sampling operation count corresponding to the initial image.

In some embodiments, the sample total sampling operation count may be determined in a similar manner as the determination of the total sampling operation count as described in connection with FIG. 13. For example, the processing device 140 may determine the sample total sampling operation count based on a first sample sampling operation count of the sample initial image and a sample historical total sampling operation count.

In 1430, the processing device 140 (e.g., the determination module 1220) may determine, based on the sample volume data, one or more sample reference parameters (also referred to as "sample casting parameter") relating to the sample initial image.

In some embodiments, the one or more sample reference parameters relating to the sample initial image may include a sample depth of each pixel in the sample initial image, a sample normal vector corresponding to the sample depth, sample label information of each pixel in the sample initial image, a sample motion vector of each pixel in the sample initial image, or the like, or any combination thereof. In some embodiments, the one or more sample reference parameters may be determined in a similar manner as the determination of the one or more reference parameters as described in connection with FIG. 13.

In 1440, the processing device 140 (e.g., the obtaining module 1210) may obtain a reference image (also referred to as "predetermined standard image") by performing a second path tracing operation on the sample volume data.

In some embodiments, the second path tracing operation may satisfy a path tracing condition. For example, the path tracing condition may include that a second sample sampling operation count used for obtaining the reference image may be larger than a sampling operation count threshold. In some embodiments, the reference image may correspond to a relatively high resolution.

In 1450, the processing device 140 (e.g., the generation module 1230) may generate the image processing model by training, based on sample historical image data, the sample initial image, the sample total sampling operation count, the one or more sample reference parameters, and the reference image, a preliminary machine learning model.

In some embodiments, the sample historical image data relating to the volume data may include a sample historical target image relating to the sample volume data, a sample historical total sampling operation count corresponding to the sample historical target image, sample historical reference parameters relating to the sample historical target image, or the like, or any combination thereof. The sample historical target image relating to the sample volume data may be a sample target image of the previous frame generated using the preliminary machine learning model (or the image processing model obtained by training the preliminary machine learning model).

In some embodiments, the image processing model may be generated according to a training process including one or more iterations. In at least one current iteration of the one or more iterations, the processing device 140 may generate, based on the sample historical image data, the sample initial image, the sample total sampling operation count, and the one or more sample reference parameters, a predicted image using the preliminary machine learning model or an intermediate machine learning model determined in a prior iteration. Further, the processing device 140 may determine, based on the predicted image and the reference image, a value of a loss function. Merely by way of example, the value of a loss function may include a difference between each pixel in the predicted image and the reference image. The processing device 140 may further determine, based on the value of the loss function, whether a termination condition is satisfied in the current iteration. Exemplary termination conditions may include that the value of the loss function obtained in the current iteration is less than a predetermined threshold, a certain count of iterations is performed, that the loss function converges such that the differences of the values of the loss function obtained in consecutive iterations are within a threshold, or the like, or any combination thereof. In response to determining that the termination condition is satisfied in the current iteration, the processing device 140 may designate the preliminary machine learning model or the intermediate machine learning model as the image processing model.

It should be noted that the above description of the process 1400 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

In some embodiments, the present disclosure may also provide a computer readable storage medium storing a computer program. When the computer program is executed by a processor (e.g., the processing device 140), the method for volume data rendering provided in the present disclosure may be implemented.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction performing system, apparatus, or device. Program code embodied on a computer readable signal medium may be transmitted using any appropriate medium, including wireless, wireline, optical fiber cable, RF, or the like, or any suitable combination of the foregoing.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for volume data rendering, implemented on a computing device having at least one storage device storing a set of instructions, and at least one processor in communication with the at least one storage device, the method comprising:
   obtaining an initial image relating to volume data of a subject by performing a path tracing operation on the volume data;
   obtaining a total sampling operation count corresponding to the initial image;
   determining, based on the volume data, one or more reference parameters relating to the initial image; and
   generating, based on historical image data relating to the volume date of the subject, the initial image, the total sampling operation count, and the one or more reference parameters, a target image using an image processing model.

2. The method of claim 1, wherein the historical image data relating to the volume data includes at least one of: a historical target image relating to the volume data, a historical total sampling operation count corresponding to the historical target image, or historical reference parameters relating to the historical target image.

3. The method of claim 2, wherein the obtaining an initial image relating to the volume data by performing a path tracing operation on the volume data includes:
   determining a viewpoint corresponding to the initial image;
   obtaining one or more tracing parameters relating to the path tracing operation; and
   for each pixel on an image plane corresponding to the initial image,
      determining one or more offset vendors in the image plane; and
      generating the initial image by performing, based on the viewpoint, the one or more tracing parameters, the one or more offset vendors, and the historical total sampling operation count corresponding to the historical image, the path tracing operation on the volume data.

4. The method of claim 3, wherein the generating the initial image by performing, based on the viewpoint, the one or more tracing parameters, the one or more offset vendors, and the historical total sampling operation count corresponding to the historical image, the path tracing operation on the volume data includes:
   obtaining a global sampling operation count range;
   determining, based on the global sampling operation count range and the historical total sampling operation count, sampling operation count corresponding to the initial image; and
   generating the initial image by performing, based on the viewpoint, the one or more tracing parameters, the one or more offset vendors, and the sampling operation count corresponding to the initial image, the path tracing operation on the volume data.

5. The method of claim 1, wherein the one or more reference parameters relating to the initial image include at least one of: a depth of each pixel in the initial image, a normal vector corresponding to the depth, label information of each pixel in the initial image, or a motion vector of each pixel in the initial image.

6. The method of claim 5, wherein the obtaining, based on the volume data, one or more reference parameters relating to the initial image includes:
   for each pixel on an image plane corresponding to the initial image,
      obtaining the depth of each pixel in the initial image by performing, based on the viewpoint and one or more tracing parameters, a ray casting operation on the volume data;
      determining the normal vector corresponding to the depth; and
      obtaining the motion vector based on the depth.

7. The method of claim 1, wherein the image processing model is generated according to a model training process including:
   obtaining a sample initial image relating to sample volume data of a sample subject by performing a first path tracing operation on the sample volume data;
   obtaining a sample total sampling operation count corresponding to the initial image;
   determining, based on the sample volume data, one or more sample reference parameters relating to the sample initial image;
   obtaining a reference image by performing a second path tracing operation on the sample volume data, wherein the second path tracing operation satisfies a path tracing condition; and
   generating the image processing model by training, based on sample historical image data, the sample initial image, the sample total sampling operation count, the one or more sample reference parameters, and the reference image, a preliminary machine learning model.

8. A system for volume data rendering, comprising:
   at least one storage medium including a set of instructions; and
   at least one processor in communication with the at least one storage medium, wherein when executing the set of instructions, the at least one processor is directed to cause the system to:

obtain an initial image relating to volume data of a subject by performing a path tracing operation on the volume data;

obtain a total sampling operation count corresponding to the initial image;

determine, based on the volume data, one or more reference parameters relating to the initial image; and generate, based on historical image data relating to the volume date of the subject, the initial image, the total sampling operation count, and the one or more reference parameters, a target image using an image processing model.

9. The system of claim 8, wherein the historical image data relating to the volume data includes at least one of: a historical target image relating to the volume data, a historical total sampling operation count corresponding to the historical target image, or historical reference parameters relating to the historical target image.

10. The system of claim 9, wherein to obtain an initial image relating to the volume data by performing a path tracing operation on the volume data, the at least one processor is directed to cause the system to:

determine a viewpoint corresponding to the initial image;

obtain one or more tracing parameters relating to the path tracing operation; and for each pixel on an image plane corresponding to the initial image, determine one or more offset vendors in the image plane; and generate the initial image by performing, based on the viewpoint, the one or more tracing parameters, the one or more offset vendors, and the historical total sampling operation count corresponding to the historical image, the path tracing operation on the volume data.

11. The system of claim 10, wherein the one or more tracing parameters include a transfer function or material information relating to the volume data.

12. The system of claim 10, wherein to generate the initial image by performing, based on the viewpoint, the one or more tracing parameters, the one or more offset vendors, and the historical total sampling operation count corresponding to the historical image, the path tracing operation on the volume data, the at least one processor is directed to cause the system to:

obtain a global sampling operation count range;

determine, based on the global sampling operation count range and the historical total sampling operation count, sampling operation count corresponding to the initial image; and generate the initial image by performing, based on the viewpoint, the one or more tracing parameters, the one or more offset vendors, and the sampling operation count corresponding to the initial image, the path tracing operation on the volume data.

13. The system of claim 12, wherein to obtain a total sampling operation count corresponding to the initial image, the at least one processor is directed to cause the system to:

determine the total sampling operation count corresponding to the initial image based on the sampling operation count and the historical total sampling operation count.

14. The system of claim 8, wherein the one or more reference parameters relating to the initial image include at least one of: a depth of each pixel in the initial image, a normal vector corresponding to the depth, label information of each pixel in the initial image, or a motion vector of each pixel in the initial image.

15. The system of claim 14, wherein to obtain, based on the volume data, one or more reference parameters relating to the initial image, the at least one processor is directed to cause the system to:

for each pixel on an image plane corresponding to the initial image, obtain the depth of each pixel in the initial image by performing, based on the viewpoint and one or more tracing parameters, a ray casting operation on the volume data;

determine the normal vector corresponding to the depth; and obtain the motion vector based on the depth.

16. The system of claim 15, wherein to obtain the depth by performing, based on the viewpoint and the one or more tracing parameters, a ray casting operation on the volume data, the at least one processor is directed to cause the system to:

for each ray in the ray casting operation, obtain an opacity on each position in the volume data along the ray;

determine an overlay opacity on the each position; and determine the depth based on the overlay opacity and an opacity threshold.

17. The system of claim 14, wherein to obtain, based on the volume data, one or more reference parameters relating to the initial image, the at least one processor is directed to cause the system to:

determine the label information of each pixel in the initial image by performing an image segmentation operation on the volume data.

18. The system of claim 8, wherein to obtain the image processing model, the at least one processor is directed to cause the system to:

obtain a sample initial image relating to sample volume data of a sample subject by performing a first path tracing operation on the sample volume data;

obtain a sample total sampling operation count corresponding to the initial image;

determine, based on the sample volume data, one or more sample reference parameters relating to the sample initial image;

obtain a reference image by performing a second path tracing operation on the sample volume data, wherein the second path tracing operation satisfies a path tracing condition; and generate the image processing model by training, based on sample historical image data, the sample initial image, the sample total sampling operation count, the one or more sample reference parameters, and the reference image, a preliminary machine learning model.

19. The system of claim 18, wherein training, based on the sample historical image data, the sample initial image, the sample total sampling operation count, the one or more sample reference parameters, and the reference image, a preliminary machine learning model includes one or more iterations, and in at least one of the one or more iterations, the at least one processor is directed to cause the system to:

generate, based on the sample historical image data, the sample initial image, the sample total sampling operation count, and the one or more sample reference parameters, a predicted image using the preliminary machine learning model or an intermediate machine learning model determined in a prior iteration;

determine, based on the predicted image and the reference image, a value of a loss function;

determine, based on the value of the loss function, whether a termination condition is satisfied in the current iteration; and in response to determining that the termination condition is satisfied in the current iteration, designate the preliminary machine learning model or the intermediate machine learning model as the image processing model.

20. A non-transitory computer readable medium, comprising executable instructions that, when executed by at least one processor, direct the at least one processor to perform a method, the method comprising:

obtaining an initial image relating to volume data of a subject by performing a path tracing operation on the volume data;

obtaining a total sampling operation count corresponding to the initial image;

determining, based on the volume data, one or more reference parameters relating to the initial image; and generating, based on historical image data relating to the volume date of the subject, the initial image, the total sampling operation count, and the one or more reference parameters, a target image using an image processing model.

* * * * *